United States Patent [19]

Rubey

[11] Patent Number: 4,519,867

[45] Date of Patent: May 28, 1985

[54] APPARATUS FOR AUTOMATED ASSEMBLY OF SHOCK DETECTORS

[75] Inventor: Ulyss R. Rubey, Lewisville, Tex.

[73] Assignee: Detectors, Inc., Graham, Tex.

[21] Appl. No.: 609,815

[22] Filed: May 14, 1984

[51] Int. Cl.³ ............................................... B31F 5/00
[52] U.S. Cl. ..................................... 156/351; 156/294;
156/356; 156/367; 156/556
[58] Field of Search ............... 156/350, 351, 294, 538,
156/539, 556–559, 367, 356

[56] References Cited

U.S. PATENT DOCUMENTS 4,177,751 12/1979 Rubey .................................. 116/201

Primary Examiner—David Simmons
Attorney, Agent, or Firm—Wofford, Fails & Zobal

[57] ABSTRACT

Apparatus for automating assembly of shock detectors having an indicator within an inner tube seemingly disposed within an outer tube, the indicator being adapted for indicating when a shock greater than a predetermined magnitude has been experienced, characterized by an assembly line machine for assembling shock detectors including a plurality of stations at which specific jobs are performed and an indexing table for moving a plurality of elements from station to successive station in the assembly line and including respective sub-assemblies for loading an inner tube into an assembly line rotator, a sealer for sealing a first end of the inner tube, an implacement mechanism for placing the indicator within the inner tube, an outer tube loader for loading the outer tube into the assembly line, a subcombination for combining and sealing the inner tube within the outer tube so as to form the shock detector and an unloader mechanism for unloading the shock detector from the assembly line with respective control means for controlling of the subelements in the assembly line. Also disclosed are the details of each of these respective subcombinations and elements.

13 Claims, 36 Drawing Figures

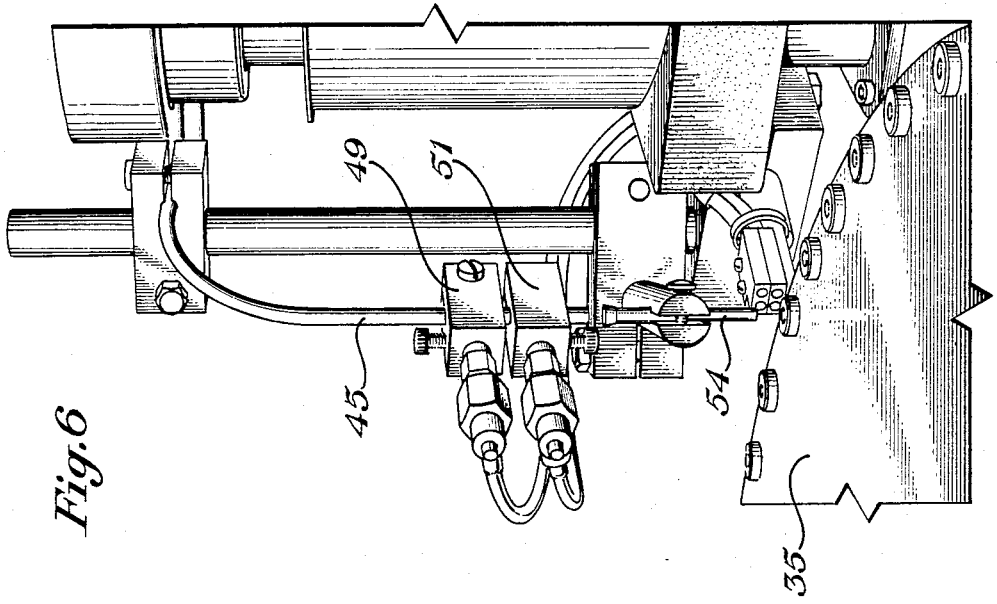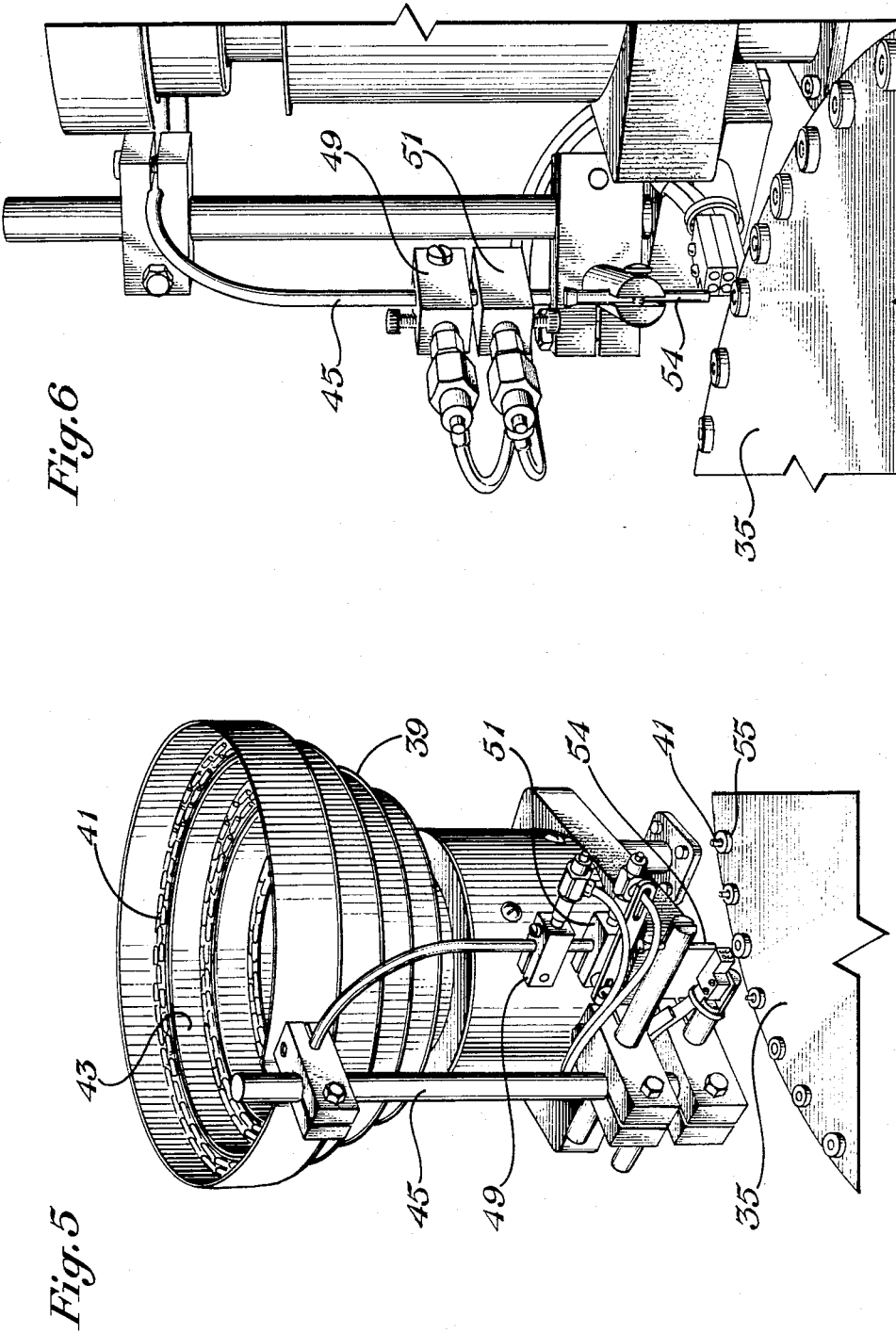

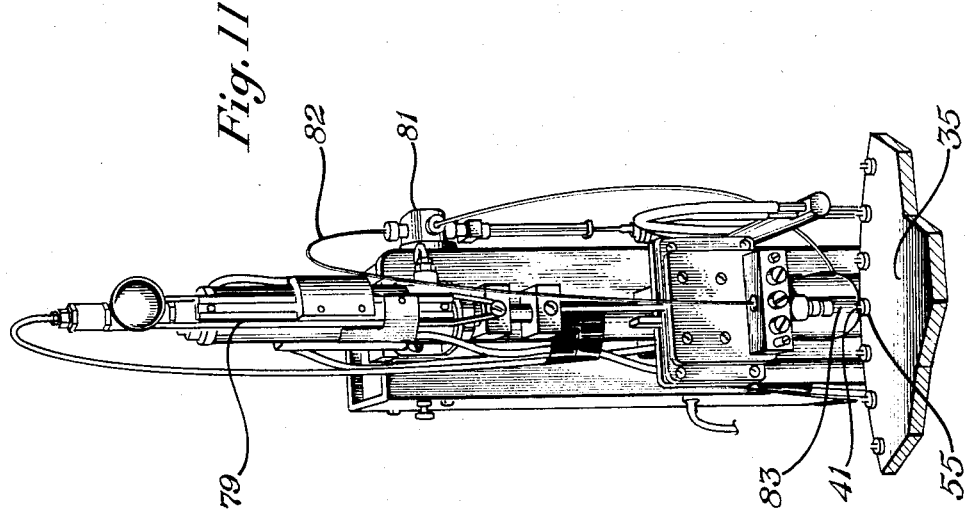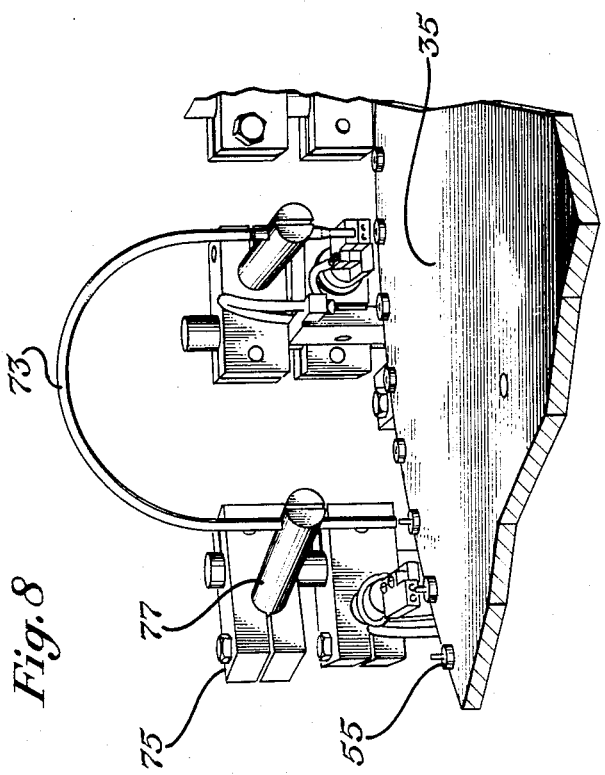

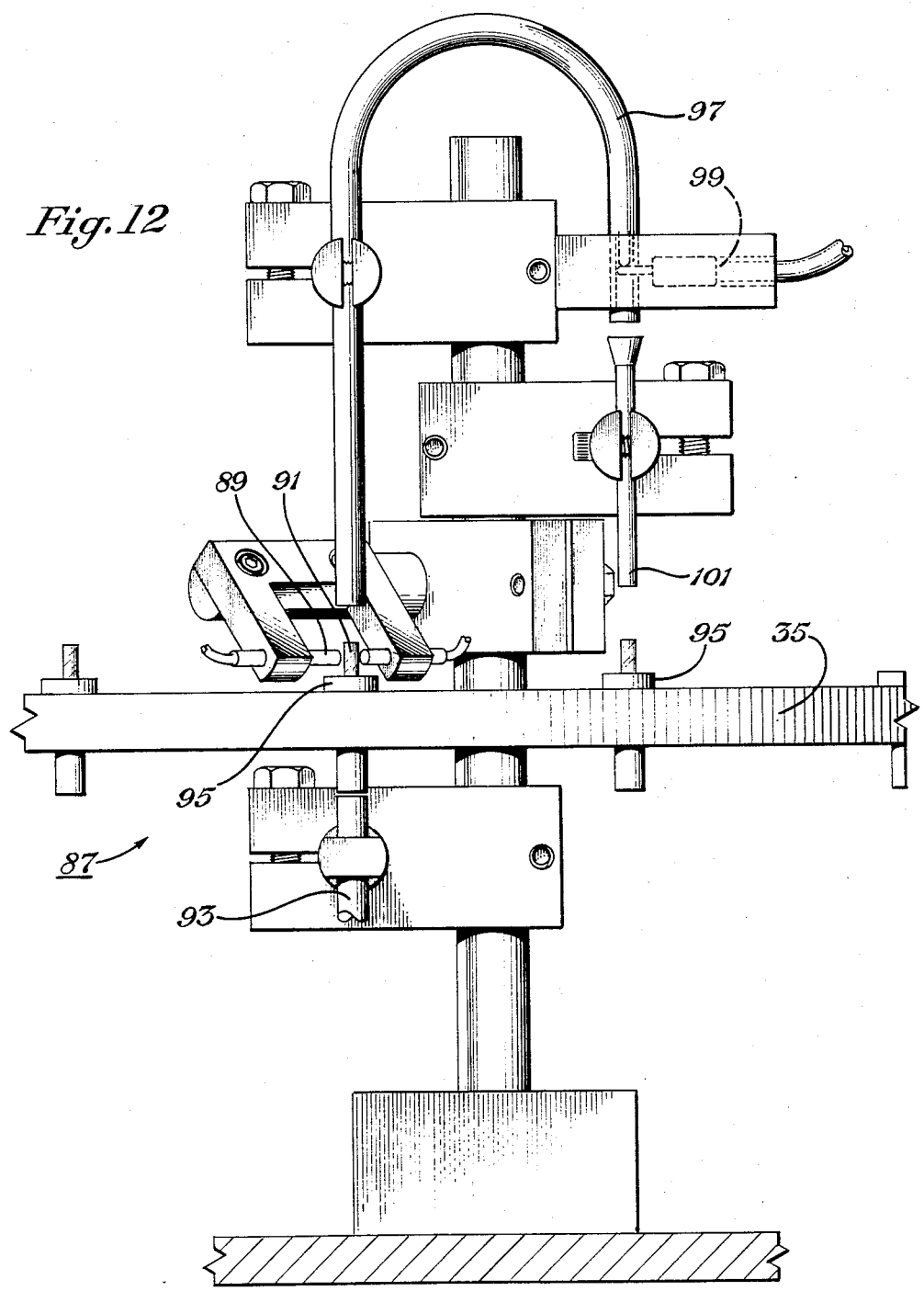

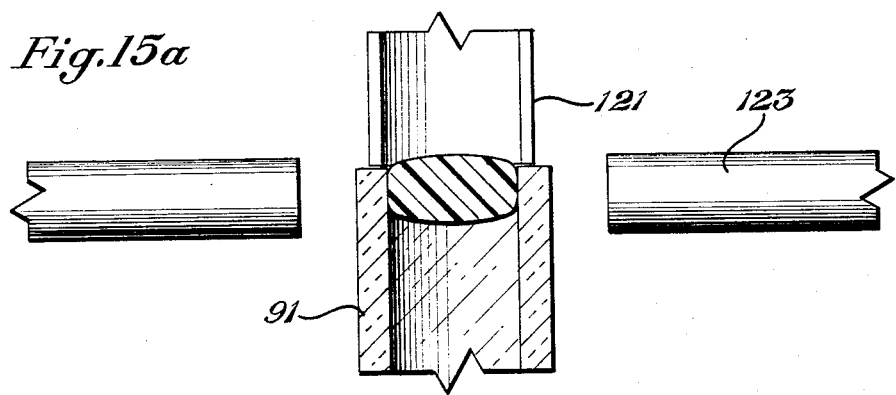
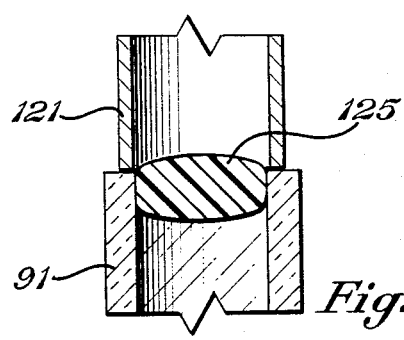
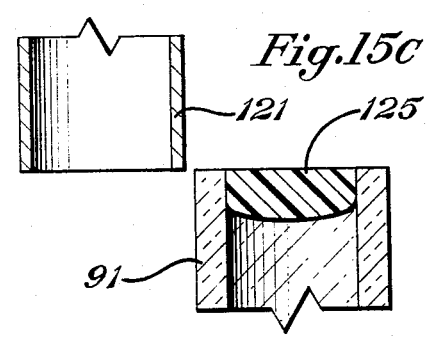
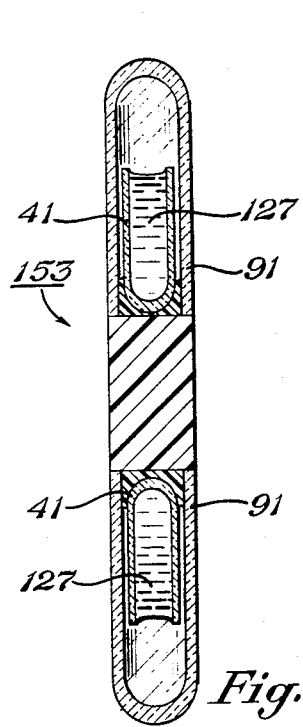
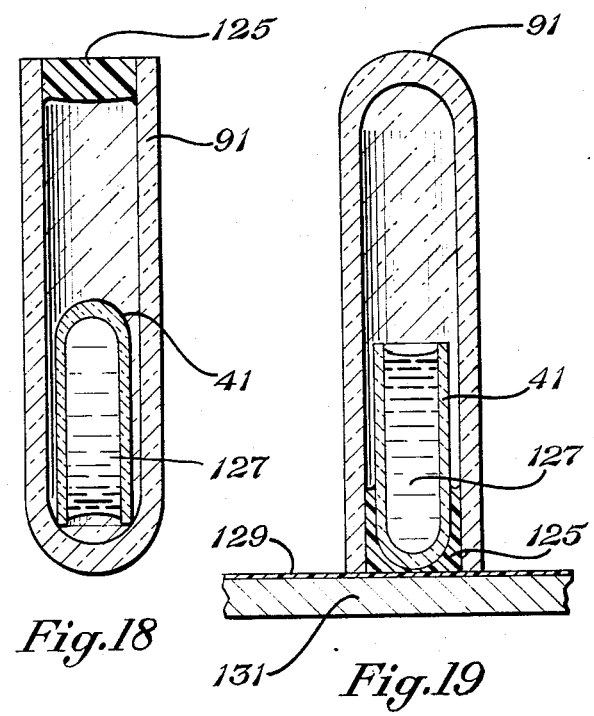

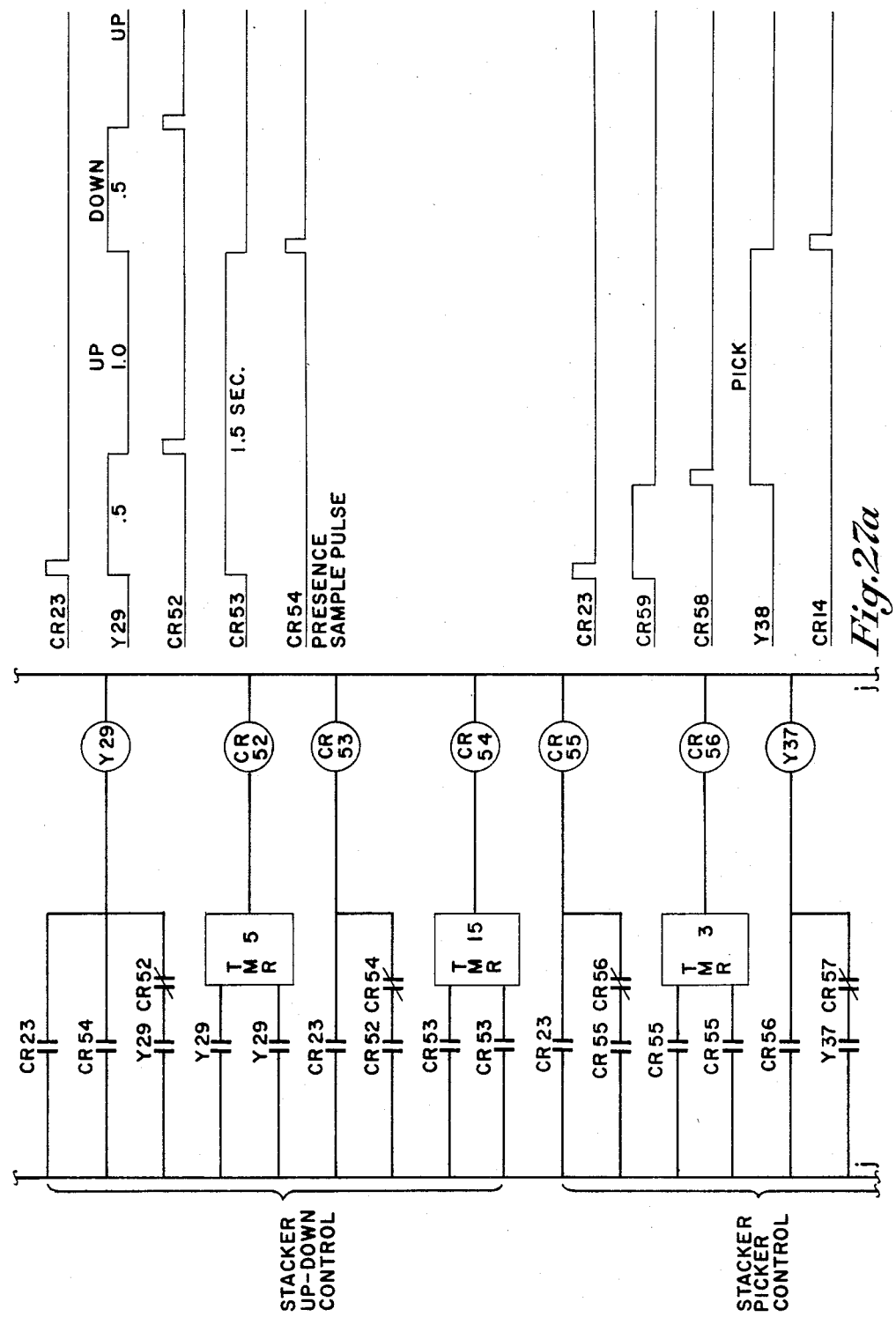

4,519,867

APPARATUS FOR AUTOMATED ASSEMBLY OF SHOCK DETECTORS

FIELD OF THE INVENTION

This invention relates to production of detectors of physical shock. More particularly, this invention relates to apparatus for automated production of the shock detectors having an indicator means within an inner tube sealingly disposed within an outer tube, the indicator being adapted for indicating when a shock greater than a predetermined shock magnitude has been experienced.

DESCRIPTION OF THE PRIOR ART

The prior art for this invention is two-faceted. In a first facet, the prior art shows a type of detector for detecting mechanical shock of sufficient magnitude to cause malfunctioning of complex electronic mechanical and electromechanical apparatus. There are two aspects to this; namely, the shock detector, per se, and the method of forming the shock detector. The closest prior art that is known pertaining to the first aspect is U.S. Pat. No. 4,068,613 "DEVICE FOR SHOWING RECEIPT OF PREDETERMINED SHOCK", Ulyss Ray Rubey. This patent described a device for affording an indication when a predetermined mechanical shock greater than a certain magnitude has been received. In that patent there was also recited U.S. Pat. Nos. 2,825,297 and 3,357,260 as well as German Pat. No. 2,515,221 showing mechanical approaches to this same problem. Closest prior art to the second aspect; namely, the method; is U.S. Pat. No. 4,177,751 issued Dec. 11, 1979 "METHOD OF FORMING A DEVICE FOR SHOWING RECEIPT OF PREDETERMINED SHOCK", a divisional application of the former one, same inventor.

As these shock detectors gained widespread usage around the world, it became apparent that the prior slow method of assembly was inadequate and that it was going to become vital to establish an automated assembly approach, not only for economy but also to keep up with the demand.

In a second facet; namely, the automated assembly approach; the prior art has seen the development of a wide range of assembly lines running from elongate lines stretching over miles for assembling aircraft to automated assembly lines for automobiles, computers and the like. No prior art has been found directly related to automated assembly of shock detectors. The approaches to assembling a large article such as airplanes and automobiles is not pertinent. Moreover, even the approach to assembling electronic components into computer and the like is not directly pertinent, since it does not involve physical chemistry, interaction of gas liquid surfaces and the like, but involves people to a greater extent.

From the foregoing, it can be seen that the prior art has failed to provide a satisfactory method or apparatus for automated assembly of shock detectors, even though there is widespread art on both the shock detectors and methods of making them; as well as to semi-automated assembly lines in other industries.

SUMMARY OF THE INVENTION

Accordingly, it is an object of this invention to marry the principles of automated assembly with the requirements of a shock detector and a method of making the same so as to produce apparatus and method for automated assembly of shock detectors.

It is a specific object of this invention to provide method and apparatus for automated assembly of shock detectors having indicator means within an inner tube sealingly disposed within an outer tube, the indicator means being adapted for indicating when a shock greater than a predetermined magnitude has been experienced, the automated assembly taking place within a very small horizontal space and without requiring many hundreds of yards or even miles of assembly line.

These and other objects will become apparent from the descriptive matter hereinafter, particularly when taken into conjunction with the appended drawings.

In accordance with this invention there is provided apparatus for automated assembly of shock detectors having an indicator means within an inner tube sealingly disposed within an outer tube, the indicator means being adapted for indicating when a shock greater than a predetermined magnitude has been experienced. The apparatus comprises:

a. an assembly line means for assembling the shock detectors including a plurality of stations at which specific jobs are performed and moving means for moving a plurality of elements from station to successive station;
 b. an inner tube loader means for loading the inner tube at an inner tube loader station;
 c. sealer means for sealing a first end of the inner tube when it is disposed at a sealer station;
 d. indicator emplacement means for emplacing the indicator means within the inner tube;
 e. outer tube loader means for loading an outer tube at another station;
 f. combining and sealing means for combining the inner tube within the outer tube so as to form the shock detector;
 g. unloader means for unloading the shock detector from the assembly line means; and
 h. control means for controlling the respective elements with a predetermined degree of automation.

The details of specific preferred embodiments are disclosed hereinafter.

BRIEF DESCRIPTION OF THE DRAWINGS

FIG. 5 is a partial isometric view showing the inner tube loader with its spiral track, feeding the inner tubes upwardly along that spiral track.

FIG. 6 is a partial perspective view of the glass tube loader, similarly as illustrated in FIGS. 4a and 4b.

FIG. 8 is a partial perspective view showing the inner tube inverter.

FIG. 11 is a perspective view from the front of the liquid dispenser of FIG. 10.

FIG. 12 is a partial front elevational view of the outer tube inverter.

FIGS. 15a, 15b, and 15c are schematic illustrations of the dispensing of the epoxy and shearing it off squarely so as to seal the end of the outer tube.

FIG. 17 is a schematic illustration of an omni-directional shock detector having a pair of respective inner tubes disposed within a pair of joined-together respective outer tubes.

FIG. 18 is a schematic illustration of a side elevational view of an embodiment of this invention in the intermediate stages of production in accordance with the method and apparatus of this invention.

FIG. 19 is a schematic illustration of a shock detector produced in accordance with this invention.

FIGS. 27a and 27b, are the final ladder diagrams of the SAM program of this invention showing primarily the stacker up-down control, stacker picker control, stacker rotate, stacker tube absent and stacker error.

DESCRIPTION OF PREFERRED EMBODIMENT(S)

While this invention and the principles thereof could be adapted to other inventions, the following descriptive matter is very specific with respect to the automated production of a detector for determining and giving an indication if a physical shock of a predetermined magnitude has been experienced by an object to which it is attached. This device is commonly referred to by the trademark SHOCKWATCH. The invention may be understood by referring to the FIGS. 1–27b which are described briefly hereinbefore.

Figure 1:
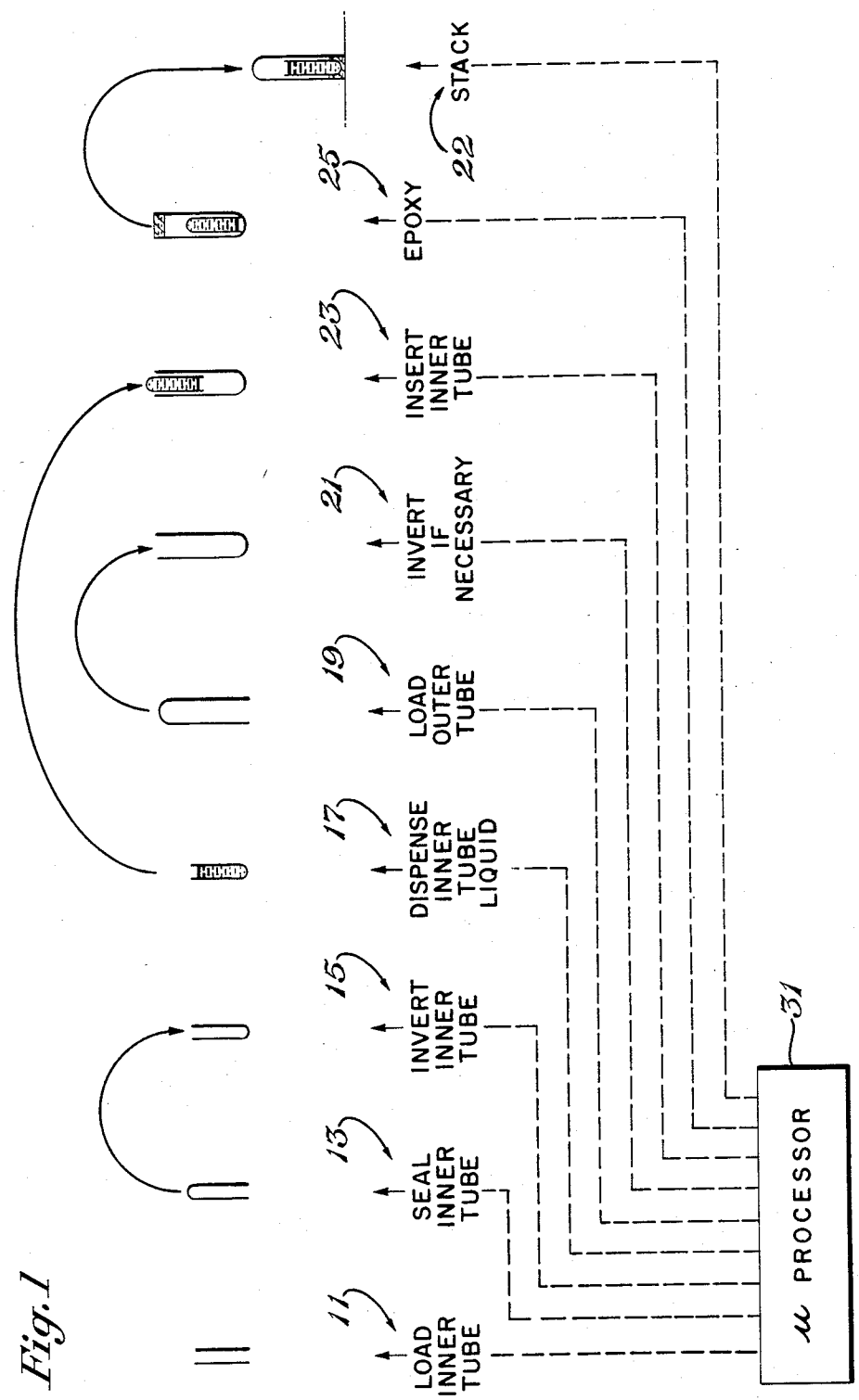
FIG. 1 is a diagramatic illustration of respective stations in the assembly line means, the respective stations in their elements being controlled by a microprocessor responsive to certain inputs in accordance with a sequence of events shown by a sequence chart and ladder diagrams appended hereto as other drawings.

Referring to FIG. 1, there is a diagrammatic illustration of the respective steps and the respective stations in the assembly line means with control being exerted by a respective microprocessor having a SAM (shockwatch assembly machine) program for monitoring the respective indicators and controlling the respective stations and elements. This figure gives an overview of the entire operation as a background for the more detailed description which follows later hereinafter.

The apparatus of this invention, as illustrated in FIG. 1, puts inner and outer tubes together with an indicator means in the form of colored liquid in the inner tube. It is employed in conjunction with a pair of other machines. The first machine is an OTAS (outer tube assembly) machine which assembles the outer tube. The second machine is LAM (label assembly machine) which attaches a label to a shockwatch.

The SAM apparatus of FIG. 1 feeds the outer tubes that are assembled priorly by the OTAS machine into a rotary index table and assembles them with pre-purchased inner tubes. The inner tubes have been bought and cut to the proper length and diameter and are placed in an inner tube feed bowl. This is a vibratory feed bowl that orients the tubes and drops them vertically into receptacles in the index table. The index table has the receptacles that are properly sized to receive the inner tubes. The inner tubes are sized so that they will fit inside the outer tubes. The first station on the SAM machine is the inner tube loader, indicated by station 11, FIG. 1 as the "load inner tube" station. Later following descriptive matter will give detailed information on respective elements at each of these respective stations; and it is believed preferable to continue the general description here. The apparatus at station 11 comprise a vibratory feeder and an escapement mechanism that releases the inner tubes one at a time into the respective receiving apertures in the index table. The second station is the inner tube seal station 13 referred to as the "seal inner tube" station. As will be seen later this makes use of a small torch which uses hydrogen and oxygen to fuel a flame approximately ¼ inch long that seals the protruding ends of the glass inner tubes.

The next station in line is the inner tube inverter at the "invert inner tube station" 15. The purpose of this is merely to turn the sealed end of the inner tube down with the open end up so that liquid indicator can be placed in the inner tube; that is, liquid can be dispensed into it at one of the following stations. The inserts that hold these tubes have a small aperture in the bottom of them and a solenoid valve in an attached conduit affords a jet of air through this aperture. The jet of air blows the sealed inner tube through a 180° stainless steel tube and drops the inner tube, with its open end up, back into the index plate, or table. The next station in line is the mechanism that places the liquid in the inner tube. At this time, the inner tube has been sealed and inverted with the open end up. The indexing table indexes the inner tube under the liquid dispenser at the "dispense inner tube liquid" station 17. At this station a hypodermic needle small enough to fit inside the inner tube is lowered and a precise amount of liquid is placed in the inner tube. After that, the hypodermic needle is raised in preparation for the next cycle.

The next station about the table and in the assembly line is the outer tube loader at the "load outer tube" station 19. The outer tube operates the same as the inner tube loader and drops the outer tubes into index plate just as the inner tube loader did. The outer tubes will have been prepared on the OTAS machine and are sealed on one end so they have to be oriented. They are loaded randomly, so they are not oriented. Accordingly, the next station in the assembly line is the station that will turn all the tubes necessary to have all the outer tubes with the open end up for receiving the inner tubes. This station is referred to as the "invert if necessary" station 21. At this station a photoelectric sensor detects if it is looking at the sealed end or the open end of the tube. If the detector sees the sealed end, the sealed end will block the light. Thereafter a jet of air is directed from the tube up through the outer tube tooling insert by way of suitable attached conduit and connected solenoid and will eject the outer tube up into inverter tube. At this time the outer tube will not drop all the way through the inverter tube because it has to wait for the open hole to be indexed to the next position. Accordingly, there is an escapement mechanism, including an air cylinder that places its shaft inside the release tube to trap and subsequently release the outer tube when the indexing table is properly oriented correctly with its aperture, or outer tube receptacle, therebeneath to receive it.

The next station in the assembly line is the inserter for the inner tube and the inner tube is inserted at the "insert inner tube" station 23. At this point the inner tube is filled with liquid with the open end up. A rotary actuator arm, which will be described in more detail hereinafter, will pick up the inner tube and insert it, after travelling 180° within the outer tube. There is a very precise fit of only about 0.001 inch difference in the OD (outer diameter) of the inner tube and the ID (inner diameter) of the outer tube so a vibration is necessary to allow the inner tube to drop into the outer tube. Yet the vibration must be very slight to prevent spilling of the liquid.

After the inner tube is within the outer tube, the next station is the epoxy dispensing station shown as "epoxy" station 25. This station seals the open end of the outer tube. Thereafter, the objective is to embed the closed end of the inner tube in the epoxy seal so the inner tube is held in place. Specifically, the epoxy station employs a syringe of premixed epoxy with an air pressure and timer to get a precise amount of epoxy correctly in place in the open end of the outer tube. The epoxy dispensing tube shears off the epoxy to make a flat clean seal. Thereafter, the outer and inner tube are inverted so the inner tube will drop into the epoxy seal and embed in it. Next, an unloader and stacker mechanism stacks the completed shock detector assemblies with the epoxy end downward at the stacker station, shown as "stack" station 27. The shock detectors are stacked on the Teflon surface, where that they slightly stick but not so badly that they cannot be readily raked from the surface into prearranged packages.

All of the foregoing are carried out with a microprocessor 31 that operates in conjunction with prearranged sequencing and program, as shown by appropriate ladder diagrams described in more detail later hereinafter.

Figure 2:
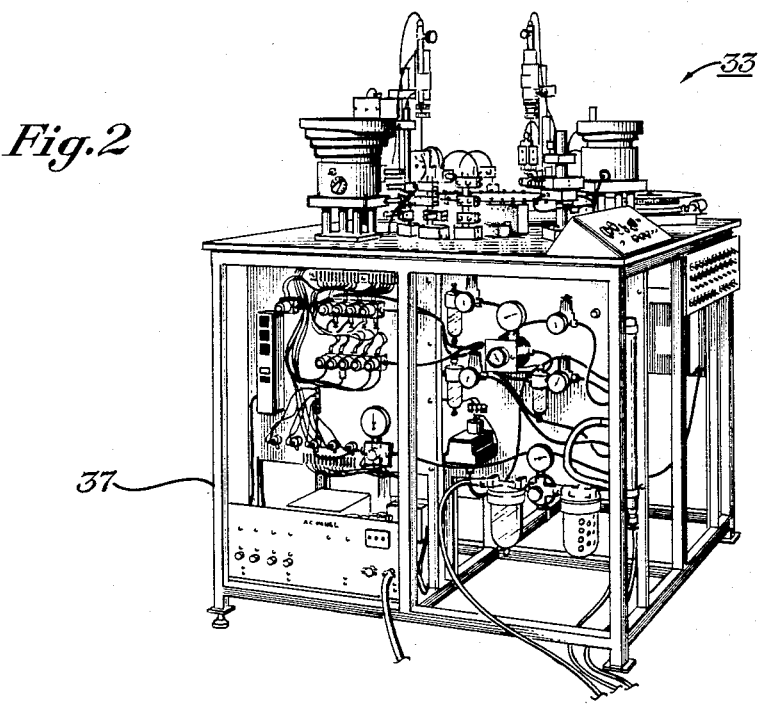
FIG. 2 is a perspective view of one embodiment of this invention in which the respective stations in the assembly line means are arranged about the periphery of a circular rotary indexing table, with respective electronic and fluidic components and control elements disposed on and mounted beneath the table surface.
Figure 3:
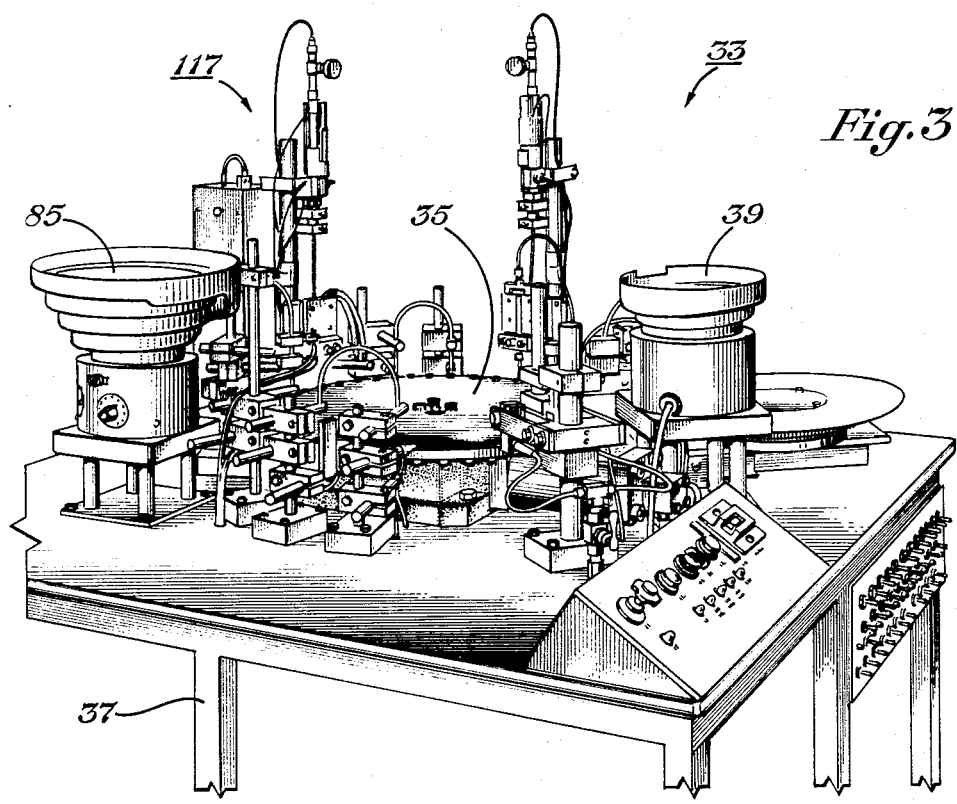
FIG. 3 is a partial perspective view of the top of the work table of FIG. 2 illustrating one arrangement of the respective elements and work stations.

Referring to FIGS. 2 and 3, there is illustrated an overview of an automated assembly line means 33 for preparing and assembling the elements. Specifically, the assembly line means 33 includes a rotary indexing table 35, FIG. 3, and a plurality of respective work stations placed thereabout. The rotary indexing table includes suitable passageway, apertures and receptacles for receiving the respective tubes from the respective loaders and adapted for carrying out the steps delineated hereinbefore. The plurality of stations are disposed peripherally around the indexing table 35, as illustrated. Suitable sensors, such as photoelectric cells, sense respective conditions, as will be described in more detail later hereinafter, and the assembly line means 33 employs suitable electronic and pneumatic controllers with respective fluids such as the pneumatic pressure, indicator fluid, and epoxy to carry out the respective operations at the respective stations. A plurality of these interconnecting liquid and gaseous fluid flow lines and gauges are shown on the bottom of the work table 37, FIG. 2. With the automated assembly line apparatus of this invention, simultaneous operations are carried at the respective stations so a completed shock detector can be turned out every few seconds.

Figure 4A:
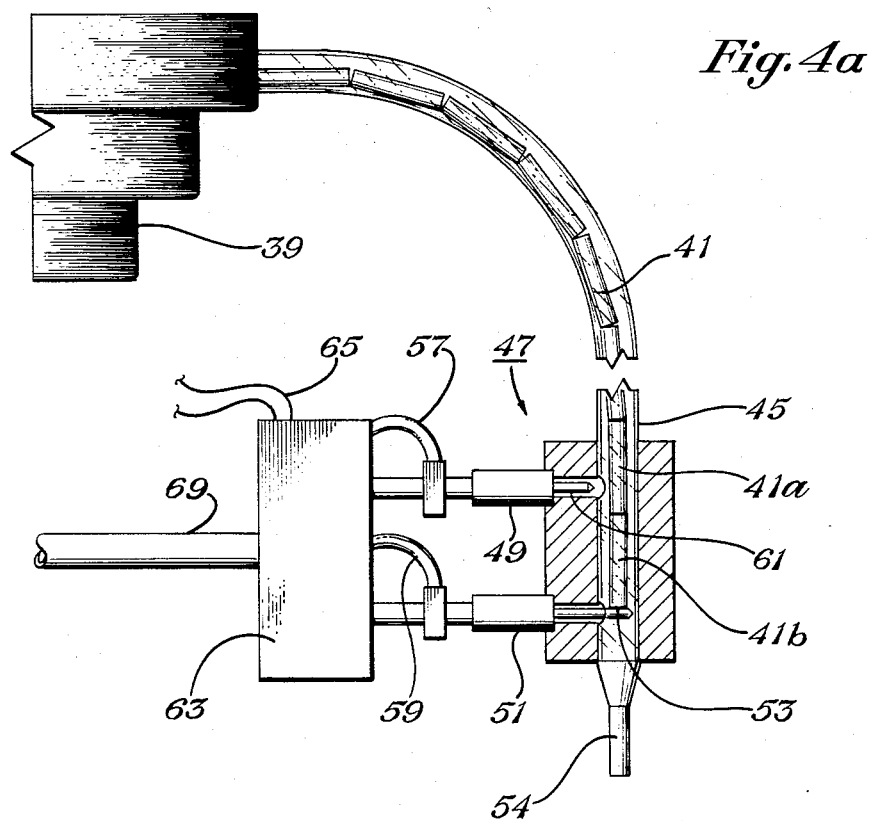
FIG. 4a is a partial side elevational view, partly schematic, illustrating a partial cross-section of a vertical tube of an inner tube dispenser with the glass tubes stacked in it and its escapement mechanism towards the bottom.
Figure 4B:
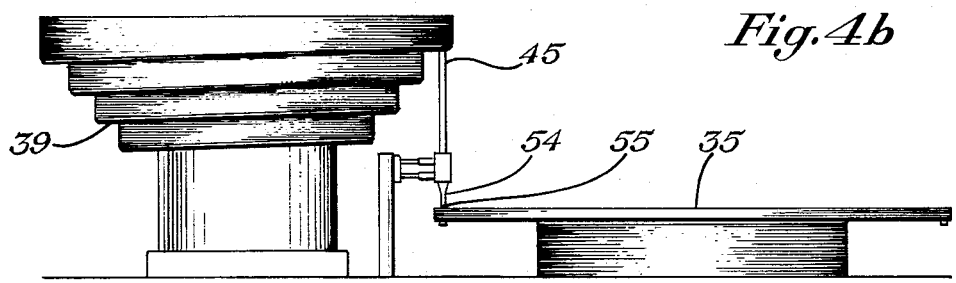
FIG. 4b is a partial side elevational view of the bowl with the feeder tubes coming off the top of the bowl in the vertical tube of FIG. 4a for feeding glass tubes into the rotary indexing table.

FIGS. 4a, 4b, 5 and 6 afford additional details of the inner tube loader, or feeder, 39. As illustrated in FIG. 5, the respective inner tubes 41 are shown as they are being vibrated upwardly around a spiraling track 43 for being delivered out of the vibratory feeder 39. As the tubes travel along the respective tracks 43, they are finally sent into a vertical tube 45 where they are stacked vertically, as illustrated in FIG. 4a. Referring to FIG. 4a, the cross-section of the tube is illustrated with the glass tubes 41 stacked therewithin. At the lower end of this tube there is an escapement mechanism 47 that includes two respective air cylinders 49, 51. As illustrated, a lower of these air cylinders, 51, is activated so that the shaft 53 protrudes through a hole in the guide tube and prevents any of the glass tubes from dropping out of the bottom of the guide tube 54 until an indexing receptacle 55, is emplaced thereunder to receive the inner glass tube 41, FIG. 5. As will become clearer later hereinafter, the receptacle 55 includes a small diameter passageway in the rotary table 35 with an air passage underneath for blowing air therethrough to move the respective tubes as necessary. Implied in the foregoing is that when the upper air cylinder 49 is energized by sending compressed air through the respective conduit 57 and air pressure is released by releasing the pressure on respective pneumatic conduit 59, the shaft 61 of the upper air cylinder 49 moves in to pin the respective glass tube 41a and prevent it from falling. The shaft 53 is then retracted to allow the lower glass tube 41b to fall through the guide tube 54 and into the receptacle 55.

While the respective pneumatic hoses 57, 59 are shown in FIG. 4a for clarity, it is frequently advisable to employ routing valve 63 to simply route high pressure air from high pressure conduit 65 directly to the respective pneumatic cylinders and to vent one of the cylinders to the atmosphere to allow retraction of its shaft. This can be done by suitable electronic controls, symbolized by the electrical control lines 65. The exact interconnection of respective pneumatic conduits and control valves are well known in the art and need not be described in great detail herein as long as the function and operation is clear as it has been described.

Figure 7:
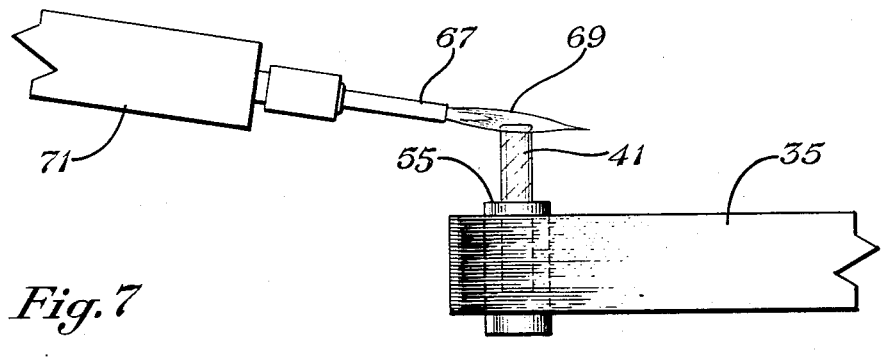
FIG. 7 is a schematic illustration of the tube sealer.

At the "seal inner tube" station 13, as indicated hereinbefore, the open end of the inner tube is sealed shut. Referring to FIG. 7, there is illustrated the hypodermic needle 67 which produces the flame 69 for sealing the respective inner tube 41. The hypodermic needle 67 is machine fit onto an aluminum tube 71. The hypodermic needle is a 24 gauge needle that is cut square on the ends and about ½ inch long. Feeding the mixer in the form of the machined aluminum tube 71 are a pair of hoses supplying hydrogen and oxygen, each at about 7 pounds per square inch gauge (psig). This generates about a ¼ inch flame and is directed against the end of the glass tube as it is indexed in place by the index plate 35. The inner glass tube 41 is held precisely in position by the receptacle insert 55 that is placed in the index plate. The cycle time on the index plate is about 3 seconds and this is sufficient time for the flame to melt the end of the inner glass tube closed.

Figure 9:
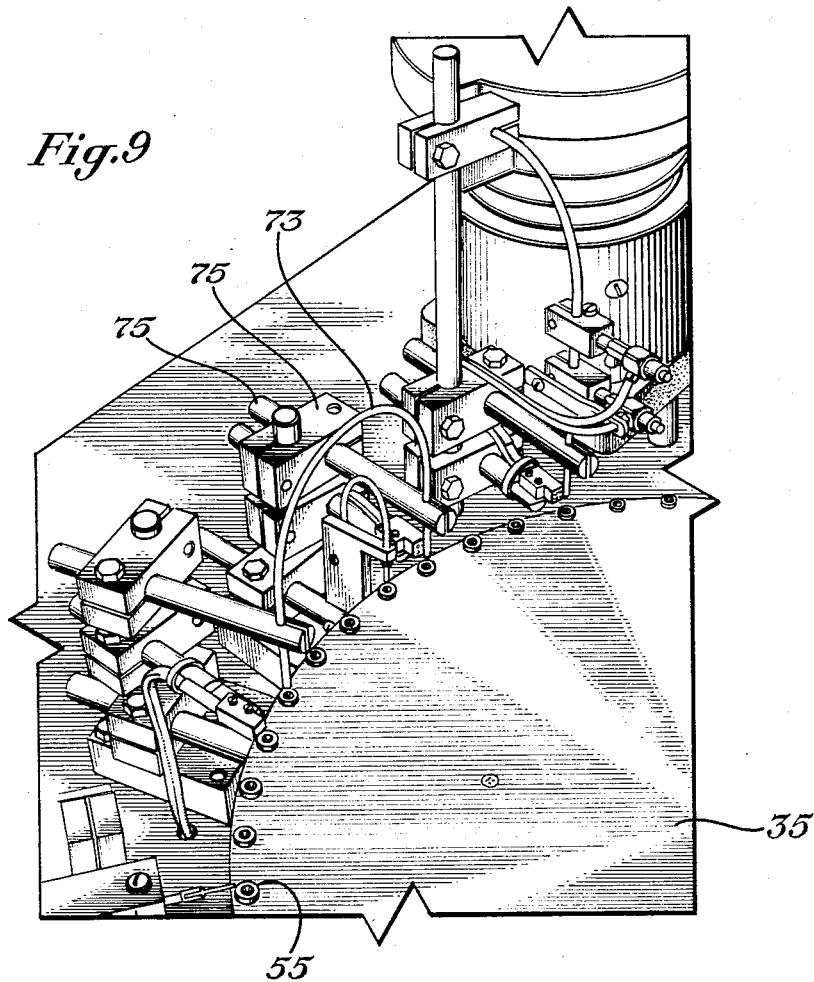
FIG. 9 is a partial perspective view showing the inner tube inverter and the lower portion of the inner tube loader.

At the "invert inner tube" station 15, as illustrated in FIGS. 8 and 9, the inner tubes with their top end sealed need to be inverted so as to be placed with their open end up so that liquid, or indicator means, can be placed therein at one of the following stations. The receptacle inserts 55 that hold the respective inner tubes in the index table 35 have a small air hole in the bottom of them. As they are indexed around, they ride over a jet (not shown) that is capable of emitting a blast of air that blows the sealed inner tube through 180° stainless steel tube 73 so that the inner tube is inverted and dropped back into the index plate at an open receptacle insert 55. A solenoid operated valve is emplaced in the pneumatic supply line that supplies air pressure to the jet to afford the jet of air that blows the inner tube up and through the 180° stainless steel tube 73. Suitable fastening blocks and arms 75, 77 can be employed as necessary to hold the 180° tube 73 properly oriented adjacent and over the respective receptacle inserts at the periphery of the indexing table 35.

Figure 10:
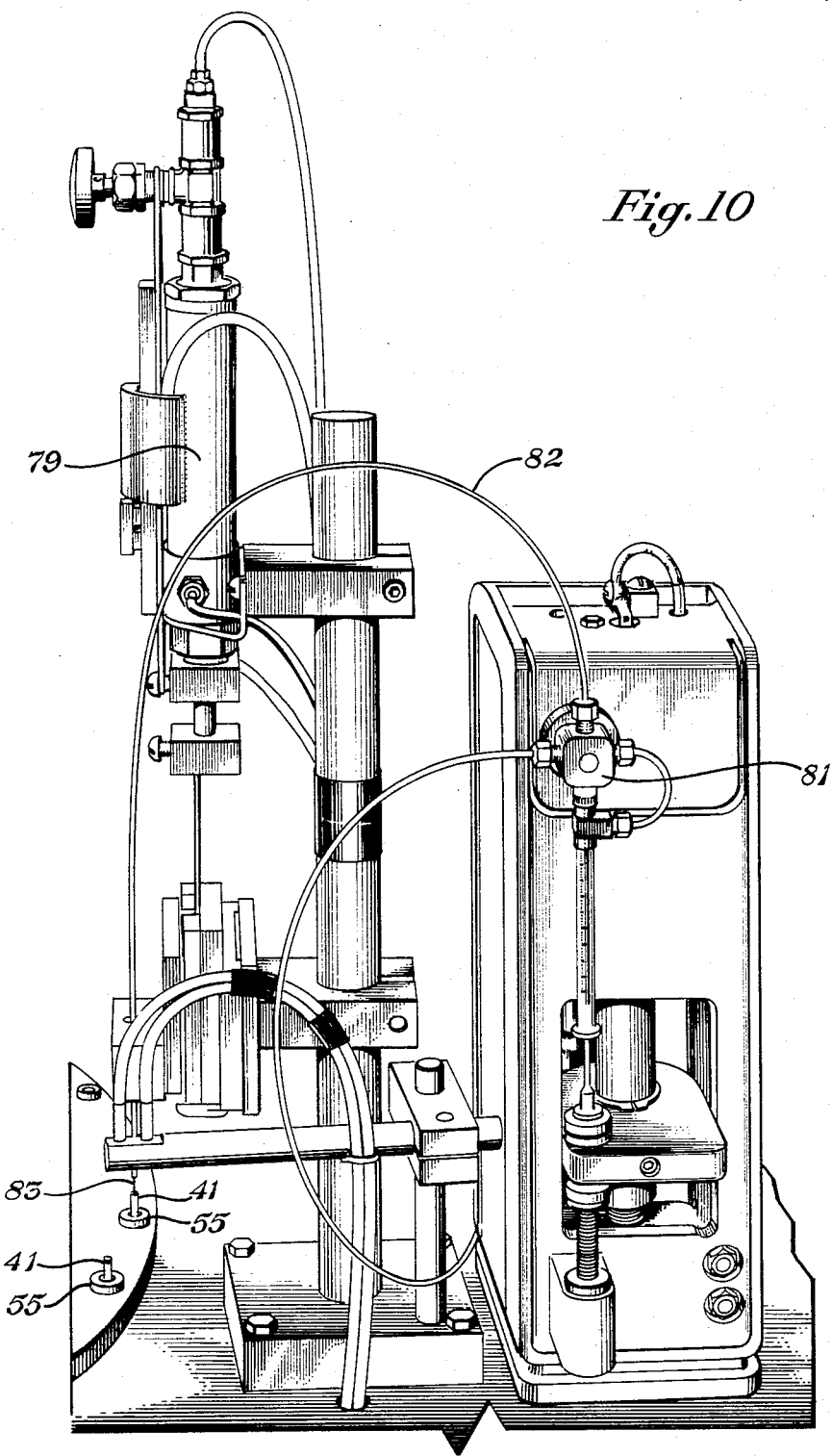
FIG. 10 is a perspective view from the side of the liquid dispenser for dispensing liquid indicator into the inner tube.

At the next station, the "dispense inner tube liquid" station 17, the liquid indicator means is placed in the inner tube. Referring to FIGS. 10 and 11, after the inner tube 41, emplaced in its receptacle insert 55, has been sealed and inverted, it is moved beneath a reciprocally movable syringe 79 that is connected by way of a three-way valve 81 with a supply of the liquid which serves as the indicator means. On the downstroke of the syringe, the valve is directed to supply the precise amount of liquid to the syringe. Then the three-way valve switches and the three-way valve directs the precise amount on through the syringe and down through a tube 82 and a hypodermic needle 83 to be injected precisely into the inner tube. Specifically, the hypodermic needle is small enough to fit inside the inner tube. It is lowered to do so. The cycle consists of first lowering the hypodermic needle inside the inner tube. A sensor senses that the needle has been lowered and gives a signal to activate the precision dispenser. The dispenser then makes its stroke and places the liquid inside of the inner tube. Next the needle 83 is raised out of the inner tube and the dispenser then loads the syringe in preparation for the next cycle.

The next station along the assembly line is the outer tube loader 85, FIG. 3, at the "load outer tube" station 19. This loader operates identically to the inner tube loader. Specifically, it drops the tubes, after vibrating them spirally upwardly along tracks, into the index plate, just as the inner tube loader drops inner tubes into the respective index plate receptacles. The outer tubes have been prepared on the OTAS machine and are sealed on one end so they have to be oriented. In this station, however, they are not necessarily oriented correctly. It is at the next station in line that all of the outer tubes are oriented with their open end up for receiving the inner tubes therewithin.

Referring to FIG. 12, there is illustrated the outer tube inverter 87 for the "invert if necessary" station 21. As noted, the outer tubes have been dropped randomly into their respective inserts and they are to be inverted only if necessary. Accordingly, it becomes necessary to determine if the outer tubes have their open end up or their closed end up. Consequently, a photoelectric sensor 89 is positioned so as to look at the end of the outer tube 91. If the sealed end of the outer tube is up, the sealed end will essentially block the light from the receiving portion of the photoelectric sensor 89. The photoelectric sensor is merely an optical pair and if the receiver does not detect light coming from the transmitter, then a jet of air will be directed from tube 93 up through the outer tube tooling insert 95 to eject the outer tube up into the inverter tube 97. At this time, the outer tube will not drop all the way through the inverter tube because it has to wait for the receiving tooling insert 95 to be indexed to the next position for receiving it in the correct orientation. Specifically, there is an air cylinder that holds its shaft inside of the tube until the next indexing of the rotary indexing table 35. The air cylinder is shown by the block 99. After the next cycle, the air cylinder 99 is activated and the air cylinder shaft retracts allowing the outer tube to drop down through the alignment tube 101 and into the tooling insert 95. If the photoelectric sensor 89 detects the light, indicating the open end of the outer tube is already oriented upwardly in the correct direction, then nothing occurs and the outer tube 91 is simply carried by the rotating index table on through to the following station.

Figure 13:
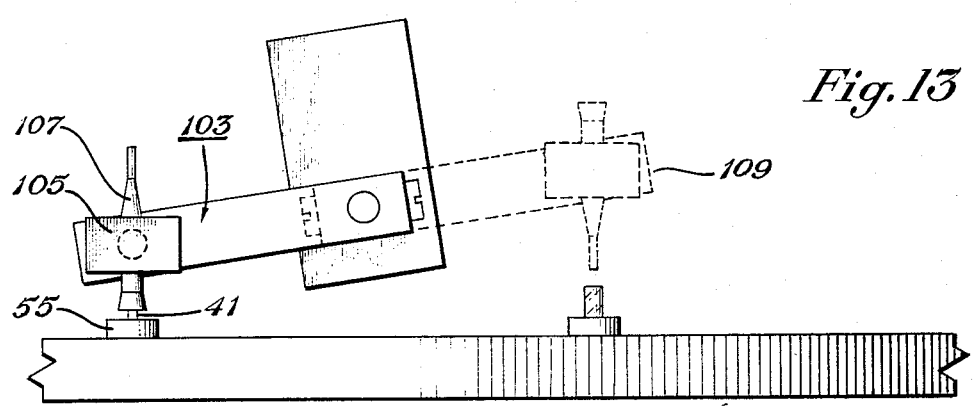
FIG. 13 is a partial front elevational view of the inner tube inserter with its rotary actuator for rotating the inner tube 180° and inserting it within the outer tube.
Figure 14:
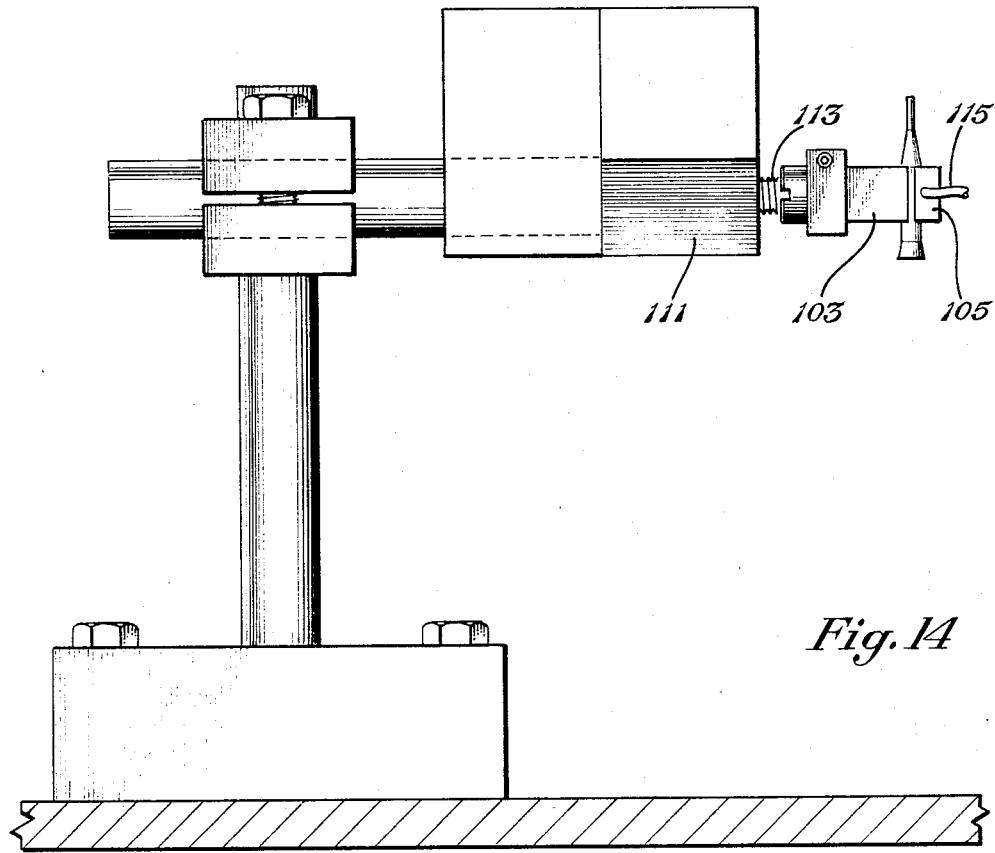
FIG. 14 is a partial side elevational view of the inner tube inserter of FIG. 13.

At the next station, the "insert inner tube station" 23, FIGS. 13 and 14, there is illustrated a rotary actuator 103 that rotates through 180°.

Referring to FIG. 13, the inner tube 41 is oriented with its open end up and filled with liquid serving as the indicator means and is sitting in the insert, or receiving receptacle, 55. The rotary actuator arm 105 rotates around and places the vacuum tube 107 down over the inner tube. This vacuum tube 107 has a hole in it about halfway up the tube with a vacuum supplied to the aperture. The vacuum thus effects picking up of the inner tube and holds it inside of the vacuum tube 107. The rotary actuator then travels through its 180° of travel and holds the inner tube open end down over the open end of the outer tube, as illustrated in ghost lines 109 of FIG. 13. The vacuum is then released and the inner tube drops downwardly into the outer tube. It is a very precise fit. Only about 0.0001 inch difference between the outer diameter of the inner tube and the inner diameter of the outer tube. Typically, therefore, the inner tube will not move downwardly into the outer tube without some slight vibration but sets on top of the outer tube with the open end down. A vibrator is then activated and places a slight vibration on the arm which allows the inner tube to seek the opening of the outer tube and to fall into the outer tube. That completes the inner tube insertion.

FIG. 14 illustrates a side view of this mechanism. The holding block 111 is simply that; namely, a holder for the rotary actuator 103. Shaft 113 protrudes from the holding block and is attached to the picker mechanism (not shown). The vacuum tube 115 is illustrated and connected to a vacuum pump or the like for picking up the inner tube.

Figure 16:
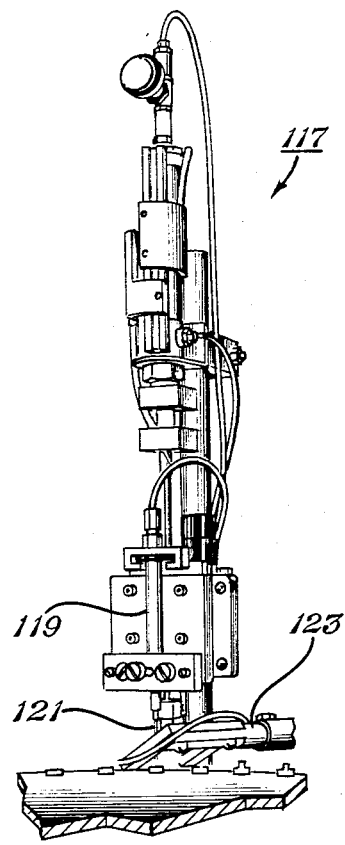
FIG. 16 is a perspective view of the epoxy dispensing station for effecting the dispensing in accordance with FIGS. 15a, b and c.

The next station is the "epoxy station" 25 and includes the epoxy dispensing apparatus 117, FIGS. 3 and 16. As indicated hereinbefore, the purpose of this station is to place an epoxy seal on the open end of the outer tube with the inner tube inside thereof. Expressed otherwise, the apparatus effects a seal on the open end of the outer tube and inverts the entire shock detector, both outer tube and inner tube, to embed the closed end of the inner tube in the epoxy seal so that it is held in place. The way this is accomplished is as follows. The outer tube with the open end up and the inner tube therewithin, is indexed beneath the epoxy station with its premixed epoxy in a hypodermic needle of a syringe. Air pressure and a timer is provided on the syringe. The syringe 119, FIG. 16, is lowered with the hypodermic needle 121 having its squared-off end emplaced directly over the open end of the outer tube. The pressure is turned on the syringe to dispense the epoxy into the open end of the outer tube. A photosensor 123 looks through the clear end of the outer tube and detects when the proper amount of epoxy has been dispensed into the outer tube, for example, as illustrated in FIG. 15a. At this point, the pressure is cut off of the syringe; but the syringe needle 121 remains down and in contact with the outer end of the tube. If the syringe needle were brought back up at this time, it would cause a stringing of the epoxy which would be undesirable for reasons which will become clear from the descriptive matter hereinafter. Before the outer tube is brought up, the index table is indexed and this shears the epoxy off, FIGS. 15b and 15c, but the epoxy seal 125 is smooth on top.

Figure 20:
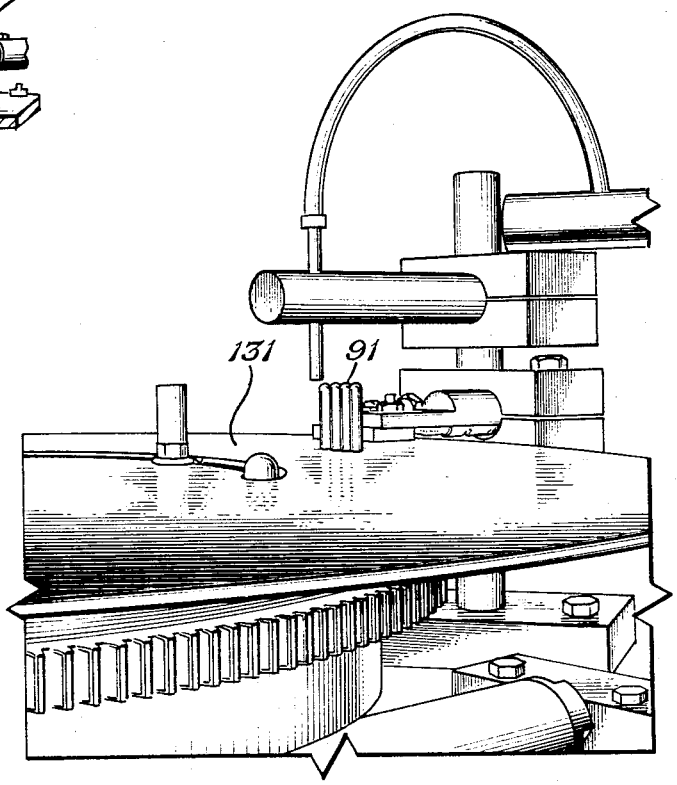
FIG. 20 is a partial perspective illustration of an accumulator portion of the apparatus of this invention.

Referring to FIG. 18, there is illustrated a blown up picture of the shock detector after it leaves station 25. Specifically, the smooth epoxy seal 125 is in the top of the outer tube 91 with the inner tube 41 disposed therewithin with the liquid serving as the indicator means 127 disposed inside of the inner tube. It is desired to have the shock detector in the form illustrated in FIG. 19 in which the inner tube 41 with its indicator 127 is embedded in the epoxy seal 125 of the outer tube 91. It so happens that this is readily effected by simply inverting the outer tube 91 with the uncured epoxy seal in contact with a Teflon surface 129 of an accumulator table 131, similarly as illustrated in FIG. 20. Specifically, at the "stack" station 27, there is an unloader mechanism 133, FIGS. 21 and 22 that will lift the completed shock detector; that is, the outer tube with the inner tube and indicator therewithin; invert if and emplace it downwardly with the epoxy seal of the outer tube on a Teflon surface. The capillary action will draw the uncured epoxy up and around the inner tube inside of the outer tube such that when it dries, there is a good seal. Yet, the epoxy does not adhere severely to the Teflon surface, so that the completed shock detector tube can simply be brushed from the Teflon surface.

Figure 21:
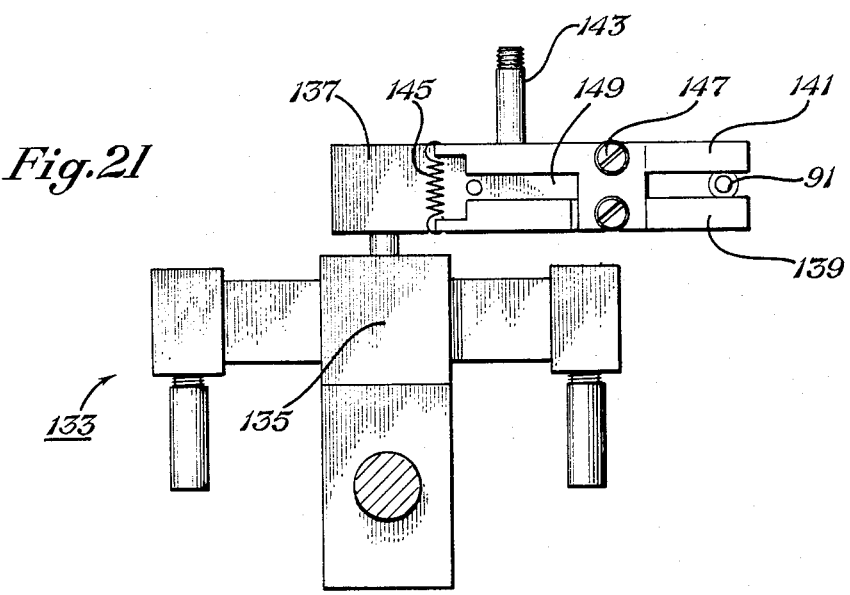
FIG. 21 is a partial plan view of an unloader mechanism in accordance with one embodiment of this invention.
Figure 22:
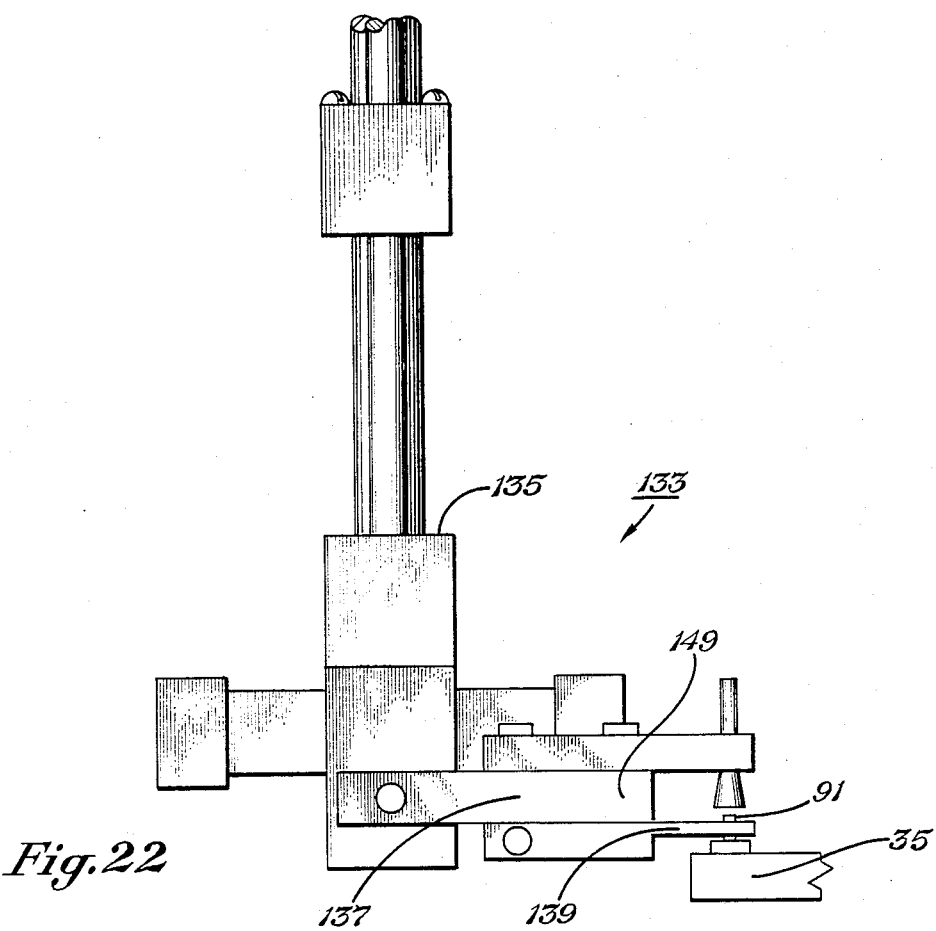
FIG. 22 is a side elevation view of the unloader mechanism of FIG. 21.

Referring to FIGS. 21 and 22, the unloader mechanism 133 consists of a reciprocally movable "up and down" mechanism 135, a rotary actuator 137 and a pair of gripper fingers 139, 141. The action of this mechanism 133 is as follows. The completed shock detector is indexed beneath the gripper fingers 139, 141. The lowering mechanism 135 lowers the gripper fingers as they are opened up so they are on the same plane as the outer tube 91. The gripper fingers are then closed by an air cylinder with air from conduit 143. Sometimes there is not an exactly correct match between the center of the space between the fingers 139 and 141 and the glass shock detector such that closure might effect breaking of the tube 91 if there was misalignment. To prevent breakage, the respective fingers are hingedly mounted for pivotal movement about mounting pivot shafts 147 with a spring 145 at an opposite end of the extension of the fingers 139 and 141 about their hinged mounting pivot shafts 147. This allows the proper closure to occur; gentle enough to ensure that the tube 91 is not broken, yet firmly enough to allow it be picked up and handled for the following portions of the cycle. The vertical cylinder, or the up and down mechanism 135, then lifts the shock detector assembly, as shown by the glass tube 91 held by the gripper fingers, out of the index plate, or rotary indexing table 35. The rotary actuator 137 then rotates the rotary actuator arm 149 through 180°, ending up with the completed shock detector assembly with the epoxy seal down and over the accumulator, illustrated in FIG. 20. The up and down mechanism 135 is then lowered and the gripper fingers 139, 141 are released. The completed shock detector assembly is then guided down against the Teflon surface on the accumulator. Thereafter, the mechanism is raised. The epoxy ends set against the surface of the accumulator 131. The accumulator plate is then indexed so as to allow room for the next shock detector assembly.

The index table can be indexed laterally, as well as sequentially such that as many as twenty rows of the completed shock detector assemblies as shown by outer tube 91 in FIG. 20, can be accumulated on the (teflon disc) before the disc is removed and a clean (empty) disc is placed on the indexer. The full discs are stored until to epoxy dries, then they are wiped into a container.

Figure 23:
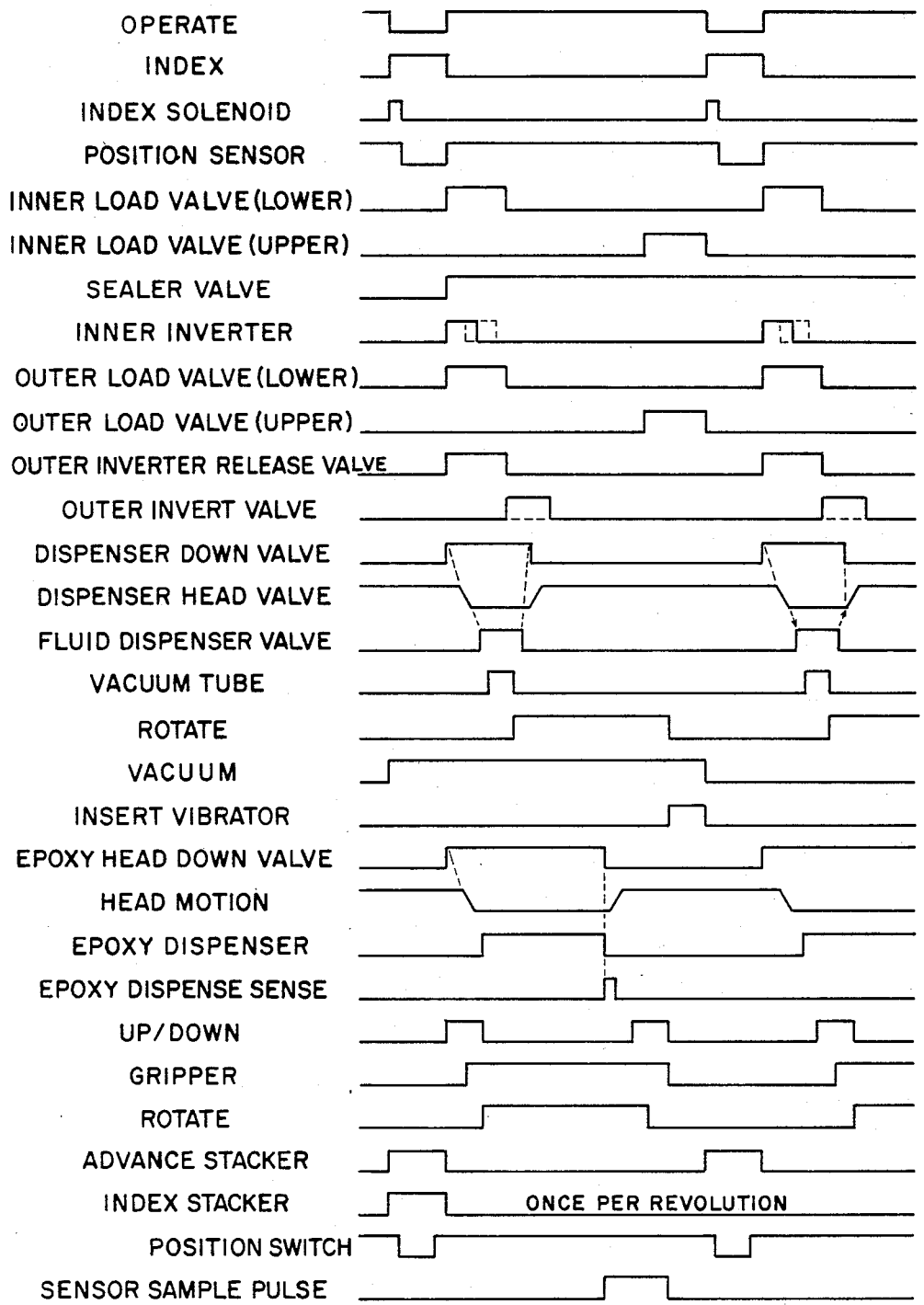
FIG. 23 is a sequence chart showing the relative sequence and duration of respective operations in the process of this invention.

The program and instrumentation will become clearer from referring to FIG. 23 showing a sequence chart of the general operation of the assembly line which makes up the SAM (Shockwatch assembly machine). As illustrated by the two top lines, there are two major cycles, the "operate cycle" and the "index" cycle. During the index cycle, the index plate, or rotary indexing table, 35 is moved from one position on to the next position. Also, during this cycle, other things occur that are not directly attached to the index plate 35. For example, the accumulator table 131 is also indexed during this cycle. Inherently, during the index cycle, the index plate is not in its proper position for any sort of an operation to be performed on either the inner tube or the outer tube, or the completed shock detector assembly. Accordingly, there is a position sensor line, shown just below the "index solenoid" in FIG. 23 that ensures that the index table 35 is in the proper position before other operations are carried out. Specifically, this is operated by a optical pair that looks though a hole, or through inserts in the index plates which have holes in them. If no light is transmitted, a defect signal is sent.

At the completion of an index cycle, the respective operations are initiated and everything occurs simultaneously at the respective stations. For example, the inner tube loader lower cylinder is activated and releases the inner tube into the plate whereas the upper part of the cylinder is activated and allows a stack of inner tubes to drop down against the lower cylinder in preparation for the next cycle. The solenoid valve that controls the sealer needle and holds it down to where it directs the flame against the inner tube is activated during this cycle and it will remain activated and has a timer on it so that it will remain down unless two cycles are skipped. After a certain length of time, it assumes that someone has stopped the machine or that the machine has stopped with an error and the timer causes raising of the torch. Under normal operations, however, there are no errors, the machine operates automatically and the sealer stays down to seal the tubes that are moved into the flame. The inner tube inverter line directs a puff of air in the inner tube inverter and, as described earlier, blows the inner tube through the 180° loop where it will drop by gravity through the closed end down into the next receptacle insert. The outer tube loader valve operates in a similar way and at the same time as the inner tube. Similarly the outer tube "invert if necessary operates, in part, like the inner tube inverter so the apparatus actually uses the same electrical signal going to a plurality (2) of sets of solenoid valves. The outer inverter release valve at this time activates unconditionally although, as indicated hereinbefore the outer tube may not need inversion. The outer invert valve is a conditional signal, as shown by the dotted line and is operated only if necessary, as described hereinbefore. Consequently, it is delayed, even if it operates, until the previous tube has been released before it activates so as to hold the tube in place for the next cycle.

Another operation is the dispenser that places the liquid into the inner tube. A signal at the beginning of the operation cycle causes the head or needle to start downward on the dispenser. The diagonal line shows the needle moving down. When it does get all the way down, a sensor detects this and the liquid dispense valve activates and goes through its cycle. At the completion of that cycle the dispenser down valve is released and the dispenser head, or needle, starts back up.

Another of the simultaneous operations is the cycle of the inserter, which has been described hereinbefore but which will be repeated in brief at this point. The tube conveying the vacuum is oriented over the inner tube, lowered, the vacuum is on to pick up the inner tube out of the insert in the rotary table. Thereafter, the tube is raised to hold the inner tube in the vacuum tube. The rotary actuator is then activated and rotates the vacuum picker mechanism 180° to hold the open end of the inner tube over the open end of the outer tube. The vacuum is then released and the inner tube dropped out of the vacuum tube in contact with the open end of the outer tube. The insert vibrator is then activated and causes the inner tube to drop inside of the open end of the outer tube. The vibration and dropping is very gentle and less than the shock necessary to cause the liquid to spill out of the open end of the inner tube.

Another operation is the mechanism that places the epoxy seal on the open end of the outer tube. Specifically, the epoxy down valve is activated. This causes the head to move down and lowers the epoxy-dispense needle into contact with the open end of the outer tube. The sensor detects when this occurs and the epoxy-dispense valve is activated. Epoxy is dispensed into the inside of the outer tube. When the proper amount of epoxy is dispensed, the epoxy-dispense sensor detects this and stops the epoxy-dispense valve. After wiping by indexing to get a smooth seal the head is caused to move back up.

Another operation is the unload operation. At this time, the completed shock detector assembly is located underneath the unloader. The up-down valve is activated which lowers the gripper fingers down around the completed outer tube. The gripper fingers are then activated to grip the outer tube. The up-down valve is then disengaged and allows the outer tube to be pulled out of the insert and the index table while it is being held by the gripper fingers. Then the rotate valve is activated to cause the rotate arm to move 180° degrees and turn the completed outer tube over and position it over the accumulator plate. At this time the up-down valve is activated again and the gripper fingers move downwardly close to the accumulator plate. The gripper fingers are released allowing the completed shock detector assembly with open end containing the epoxy seal to drop downwardly onto the accumulator plate. At the completion of each cycle and during the index cycle, while the index plate is moving to its next position, the accumulator plate is advanced to its next position so that the next completed shock detector tube can be loaded onto the accumulator plate. After 180 tubes are loaded onto the accumulator plate, a complete circle of tubes is formed, and the stacker has to be advanced laterally so that another row of 180 tubes can be emplaced thereon. When it is advanced to the next row there is a sensor switch that detects when the advancing has been completed.

The last signal on FIG. 23 is referred to as a "sensor sample pulse". There are a plurality of air sensors that are located throughout the assembly line machine to detect that all operations are taking place properly. By the time the sensor sample pulse occurs, everything should be in a proper position so this just monitors the various sensors and makes sure that everything has occurred properly. If one of the sensors has not operated successfully, then the machine is stopped before it goes into the next indexing cycle.

Figure 24A:
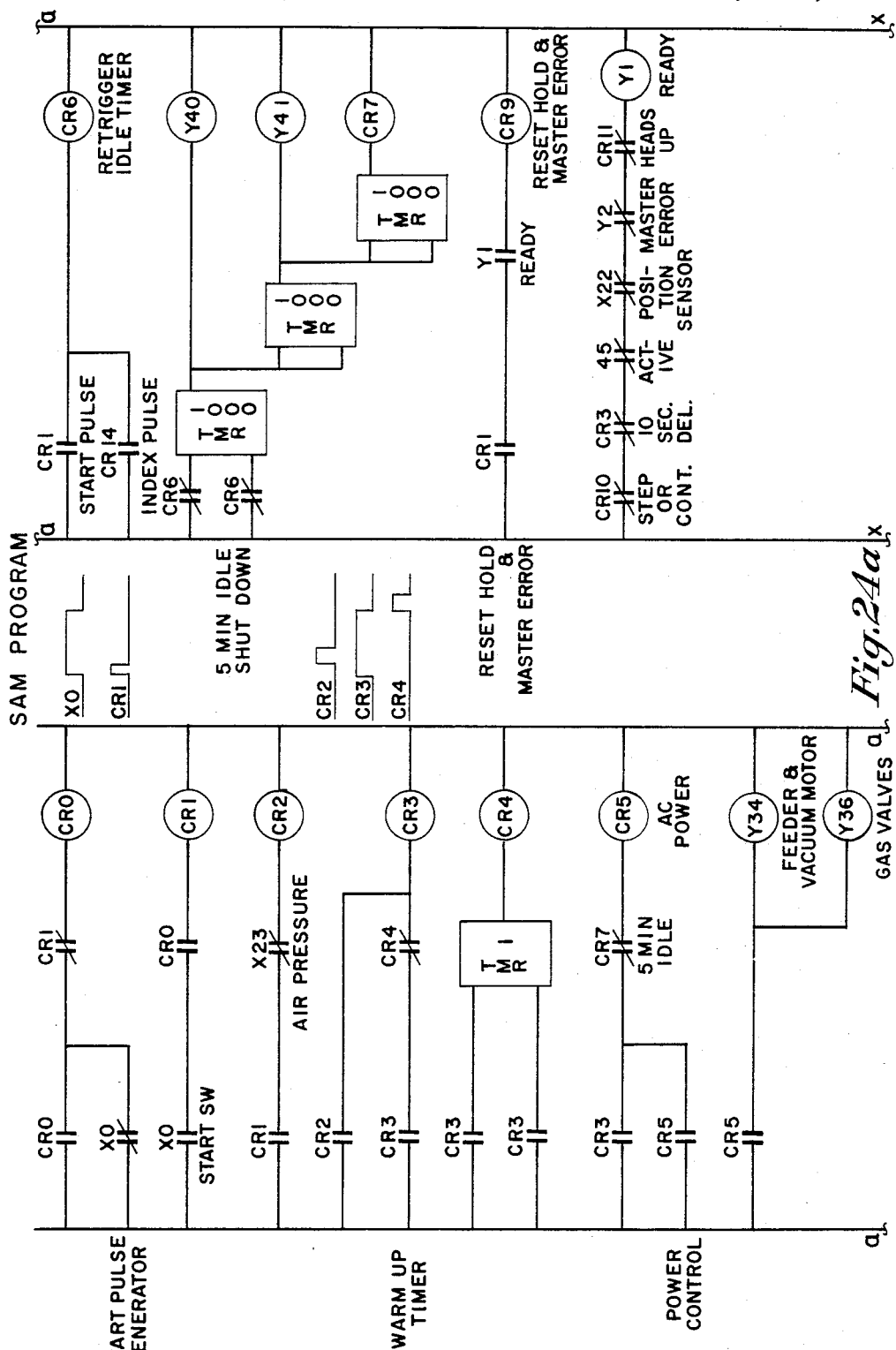
FIGS. 24a and 24b are respective ladder diagrams of the SAM program of this invention showing primarily operation of the start pulse generator, warm up timer, power control, five minute idle shutdown, reset hold and master error, stop latch, hold and last cycle memory.
Figure 24B:
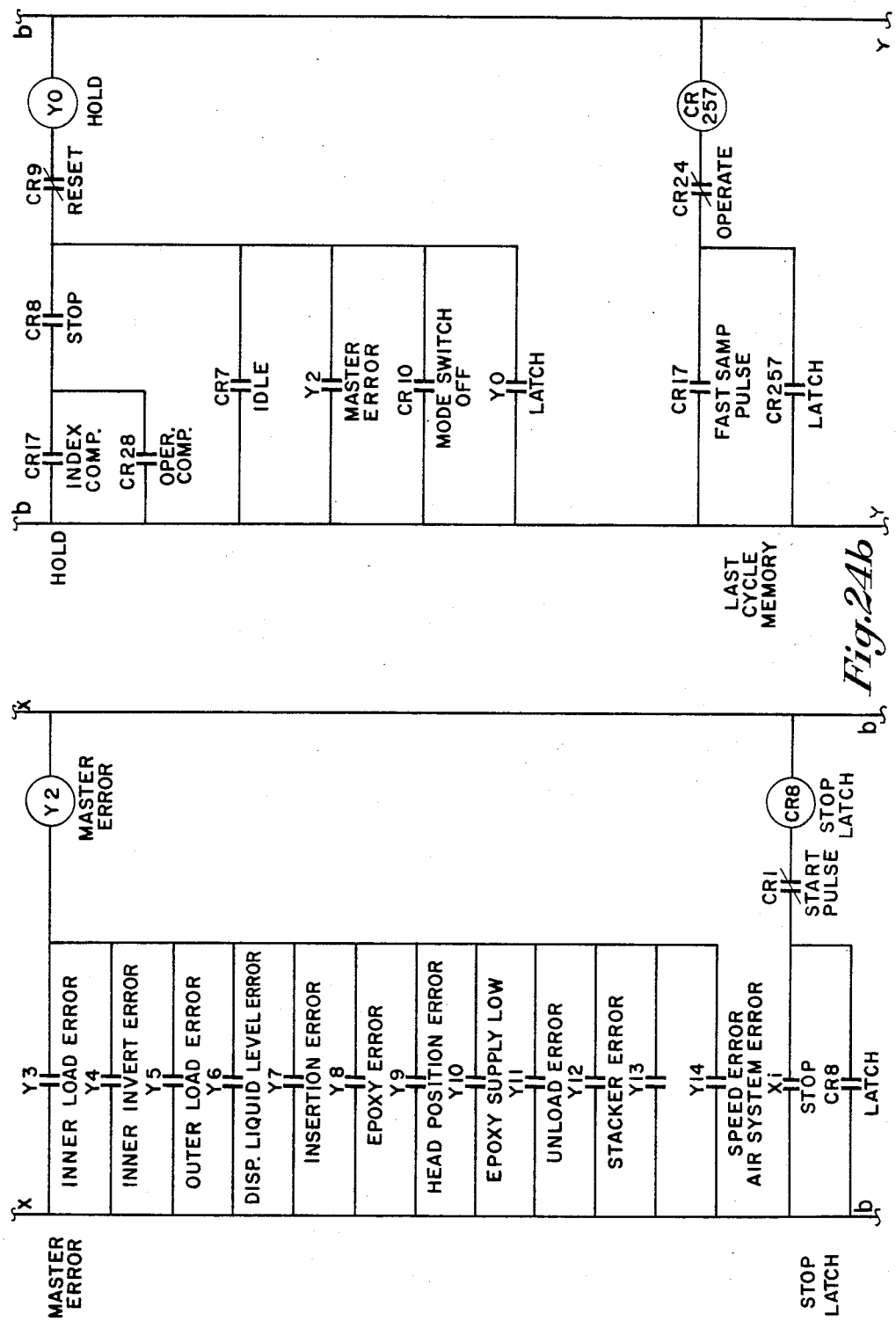

Referring to FIGS. 24a and 24b, the ladder diagram starts with the start pulse generator in the upper left hand corner. Regardless of how long the operator holds the switch down, the CR1 will activate for just one time for a given amount of time so it prevents any noise from getting into the system from someone vibrating the start switches or the like. This starts the next sequence which is the warm-up timer. Not much time is required for this, since it is merely to get the motors up to speed. For example, it allows the vacuum and air motors to come to speed and vacuum to build up and the air pressure to build up. This also causes CR3 to activate, which pulls in a switch to supply alternating current power to the machine and turns on the feeders, any additional motors and the gas valves. The next item, as seen on the right hand side of FIG. 24a is the five minute idle shut-down timer. This merely turns everything off if nothing has occurred for five minutes. For example, if an operator goes off and leaves the machine and it stops on an error and it has not been corrected within 5 minutes the machine shuts down automatically.

The convention used herein is the small letters to designate continuing portions of the ladder diagrams. For example, as can be seen by the little letters "aa" at the bottom of the left hand side and at the top of the right hand side, the ladder diagram continues on the right hand side of FIG. 24a. Similarly, the letters "xx" show that the ladder diagram continues on FIG. 24b and the letters "bb" show that the ladder diagram is continued from the bottom left hand side of FIG. 24b on the top right hand side of FIG. 24b.

The next two lines on FIG. 24a are the "reset hold and master error". These are used to monitor the system at the end of each cycle. If any errors occur, if the machine is out of position, if it is during the 10 second delay warm-up timer, or if it is in the step mode rather than in the continuous mode; then it is not ready and the machine will stop at the end of that cycle. However, if the machine is in the continuous mode, there are no errors or abnormal conditions, then the "ready" signal will be given and Y1 activated so the machine will continue to operate throughout further cycles.

The next element, the "master error" element shows a large "or" gate with the various errors that can occur on the machine combined or "or'd" into this gate. This gives us a Y2 master error if we have any of the error conditions as they are listed. For example, the top one is the inner tube load error. Others include the inner invert error, outer load error, dispense (disp) level error, insertion error, epoxy error, head position error, epoxy supply low, unload error, stacker error, speed error, or air systems error. Expressed otherwise, if any of these occur, there is a signal given by Y2 of some sort of master error which stops the machine.

The next line shown is a "stop latch" which coacts with the "hold" latch to ensure that the machine is brought to an orderly halt if an error occurs or if the operator hits the stop switch. For example, the machine could be in either the index mode or the operate mode when a stop condition occurred, so the stop latch has the last cycle memory flip-flop to tell whether the next cycle should be "index" or "operate" as a part of the last "last cycle memory".

Figure 25A:
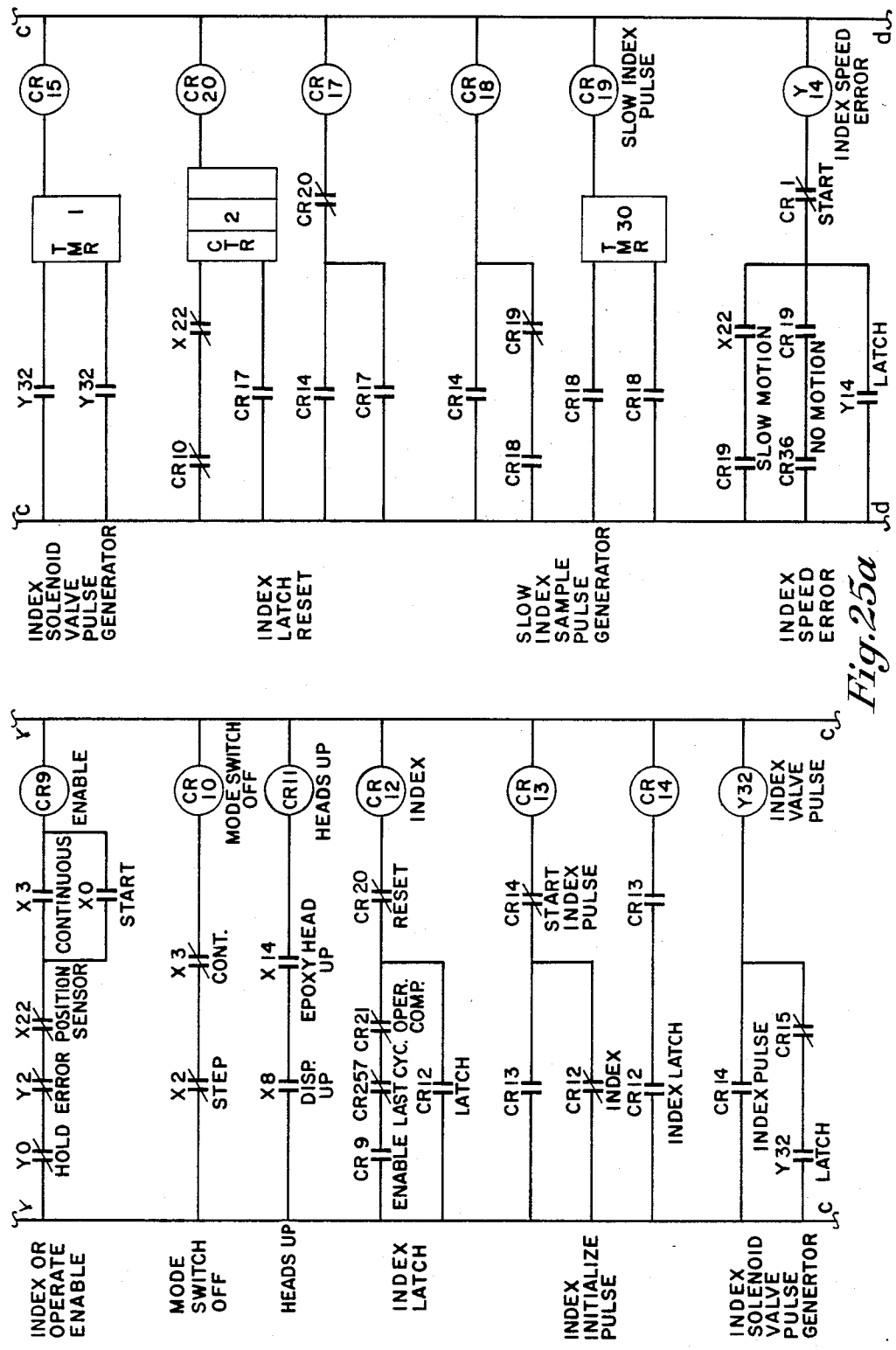
FIGS. 25a and 25b are further diagrams of the SAM program of this invention showing primarily the index or operate enable, mode switch off, heads up, index latch, index initialize pulse, index solenoid valve pulse generator, index latch reset, slow index sample pulse generator, index speed error, position error, air system error, index motion, head position error, error sample pulse, activity monitor, stacker advance, advance timer, advance detector and 180 counter.
Figure 25B:
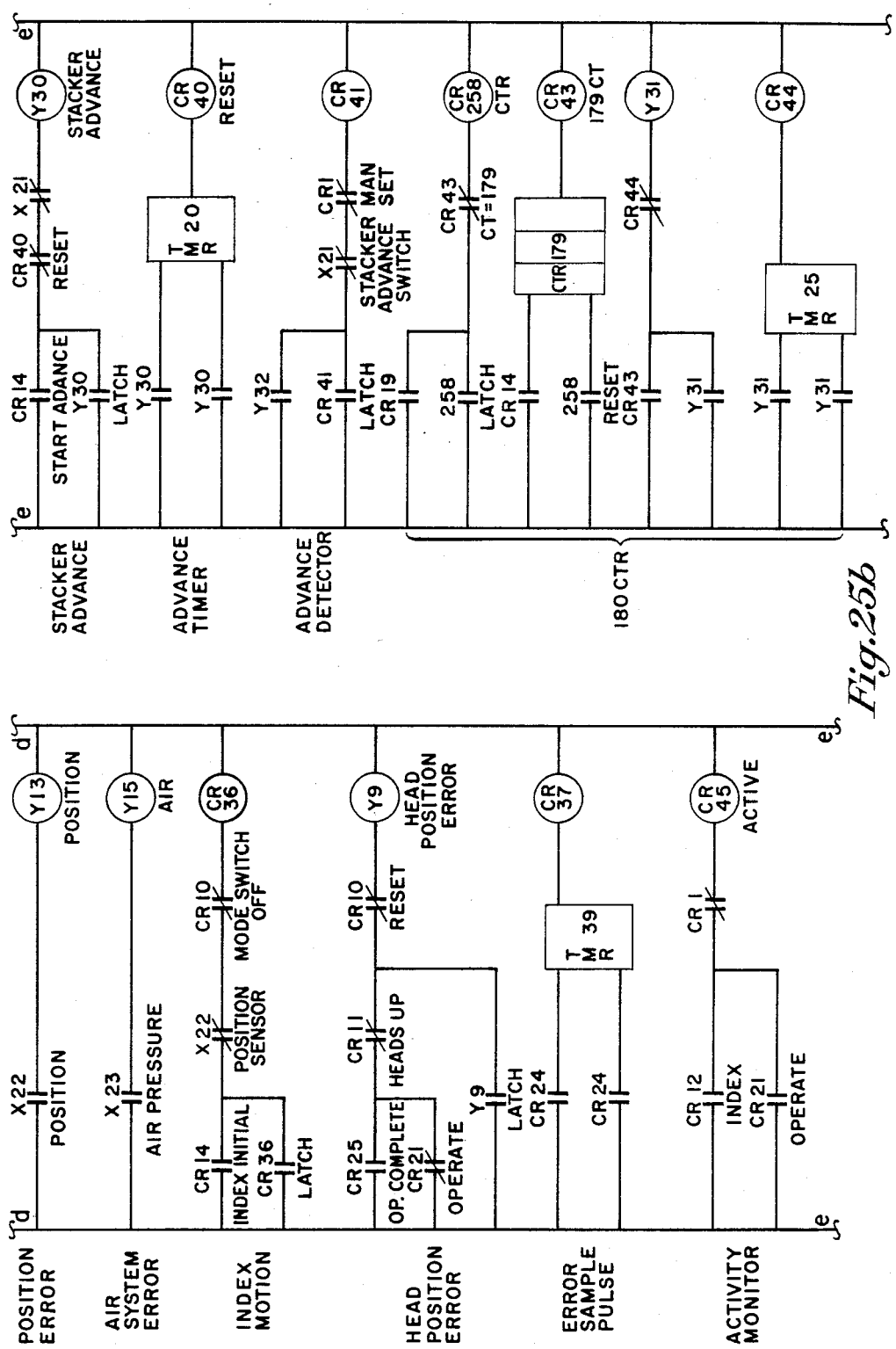

Referring to FIGS. 25a and 25b, the ladder diagram is continued. There is illustrated the "index or operate enable" flip flop to tell if there were any position sensors or errors or other problems with the machine that would prevent obtaining an "enable" signal so as to be able to proceed. The mode switch tells whether the operator has placed the machine in the step mode or the continuous (CONT) mode. If it is in the step mode, then the operator has to hit the start cycle for every cycle. If the machine is in the continuous mode, then it will automatically go on to the next cycle. The "heads up" sensor detects and prevents the machine from moving on if either the dispenser head or the epoxy head is not in the up position at the end of the operate cycle. "Index latch" is activated during the index cycle and initiates the various things that must occur during the index cycle. The "index initialize pulse" will occur if everything is in the proper position and there were no errors at the completion of the operation cycle. The index initialize pulse will cause the index solenoid valve pulsing generator to generate a pulse which will index the index table 35. The timer, TMR 1, gives us one second to index the table. The 1 indicates one second time. The "index latch reset" includes the counter 2 and is used to reset the index latch at the completion of the index cycle.

The same convention is employed in the remaining FIGS., the letters "cc" showing continuation on top right hand side; and "dd" showing continuation on FIG. 25b.

The indication that the index cycle is complete is the position sensor senses one of the inserts in the shock detector assembly index plate as described hereinbefore. The index plate actually has both inner and outer tubes with sensing means for sensing two respective apertures for each index. So, this index latch reset causes the first sensor to be ignored and only uses the second sensor and second hole, or aperture. In effect, the apparatus only senses the aperture in the outer tube insert and ignores the aperture in the inner tube insert. In fact, they should be together, such that if one is sensed, both should be sensed. The "slow index sample pulse generator" has a timer TMR 30 that indicates if an index cycle has been initiated and takes too long to complete then an index speed error signal is generated. For example, if something got lodged on the rotary table, like the operator's finger or something like that, the index speed error would cause the machine to stop and it would not try to go on.

With respect to the "position error", the sensor generates the signal X22 when the rotary indexing table 35 is in the correct position. If X22 is not sensed, then there is a position error and Y13 is signalled showing a position error. This position error is ignored during the index cycle but if it occurs during the operation cycle, it will be considered an abnormal condition and bring the machine to a halt. X23 is an air pressure switch sensor. If the air pressure is not at the proper pressure, either too high or too low, then Y15 will be activated and this will stop the machine also.

The "index motion" sensor CR36 is used in conjunction with some of the other index control circuits. This merely advises that the table is in motion and is not stopped at this time. The "head position error" is used to indicate that the heads are not up at the proper time. CR25 is a part of this circuit. This occurs at the completion of the operation cycle. CR11 advises if the heads are up. Expressed otherwise, Y9 will be set to indicate an error condition which will light the proper light on the maintanance panel and the master error light on the operator's panel and bring the machine to a halt. The "error sample pulse" CR37 occurs every cycle at the end of the operation cycle to sample all the error sensors. The "activity monitor" advises if you are in the operation cycle or the index cycle.

At the top right hand side of FIG. 25b, the stacker advance Y30 activates the stacker advance solenoid. This is controlled by the "advance timer". The advance timer is set at 20 which gives two seconds to advance the stacker. The X21 on the "advance detector" tells us if we really did advance the stacker. The "180 counter (CTR) is used to detect that the stacker has been advanced 180 times and that at the end, the stacker must be indexed to a new row.

Figure 26A:
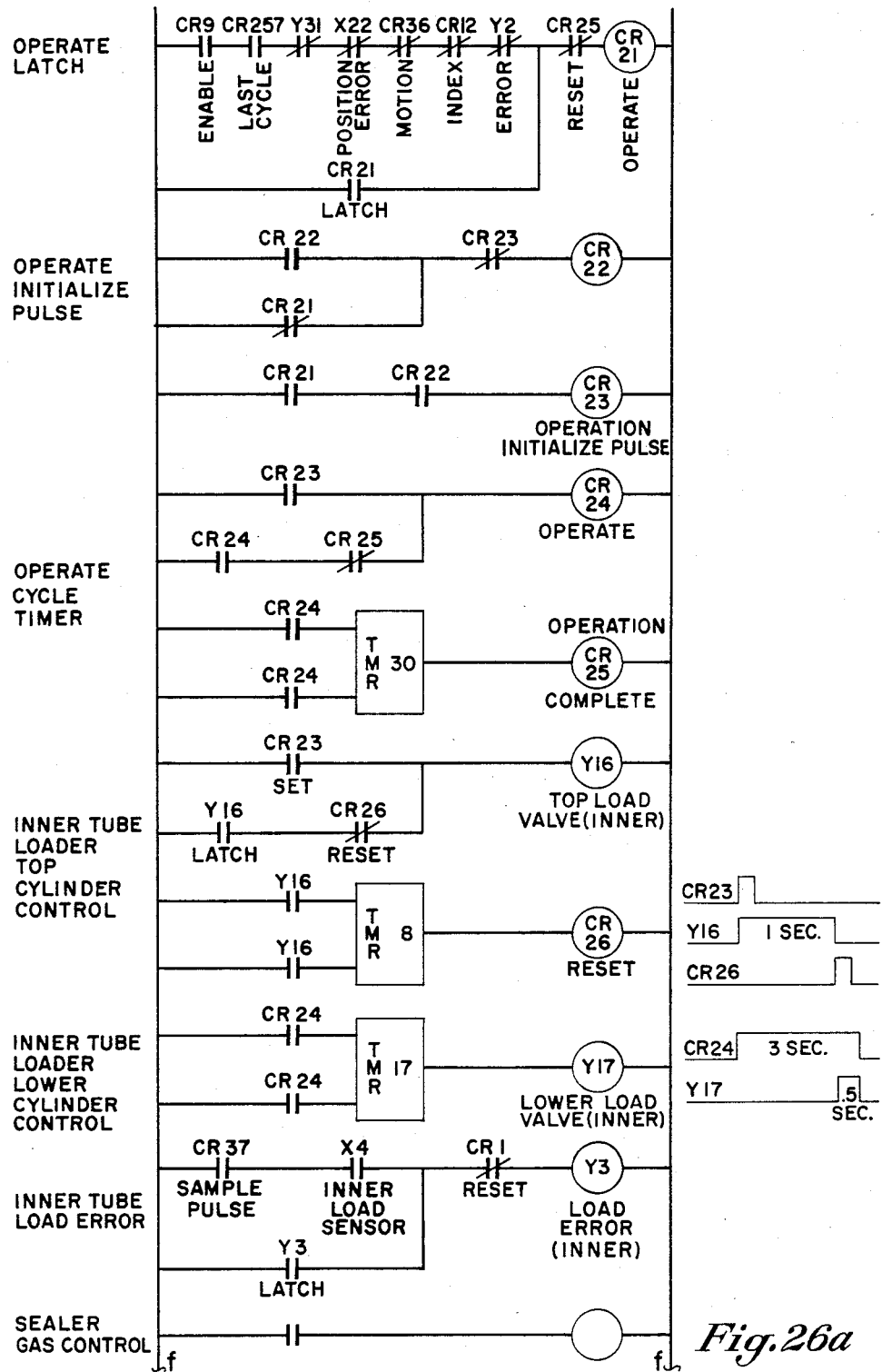
FIGS. 26a, 26b, 26c and 26d are also ladder diagrams of the SAM program of this invention, primarily showing the operate latch, operate initialize pulse, operate cycle timer, inner tube loader top cylinder control, inner tube loader lower cylinder control, inner tube load error, sealer gas control, sealer up/down control, inner tube inverter control, inner tube inverter error, outer tube loader top cylinder control, outer tube loader lower cylinder control, outer tube load error or invert error, outer tube inverter release control, outer inverter valve control, dispenser up/down latch, PLD dispenser initial pulse generator, PLD dispenser valve control, PLD timer, liquid level error, insert rotate control, rotate timer, insert suction control, suction timer, insert vibrator control, vibrator timer, dispense epoxy, epoxy head up/down control, epoxy, error, misplaced tube error and insert error.

Referring to FIGS. 26a, b, c, and d, the top left hand side shows the "operate latch". This monitors the condition of the machine and the index latch and when the index has been completed and the table is in the position sensed by X22 the machine knows to go into the operate cycle. This generates an "operate initialze pulse" and "operate cycle timer" signal. The operate cycle timer is set for three seconds (indicated by 30); and, during that three seconds, all of the operations of the SAM are completed.

Next are illustrated the inner tube top and lower cylinder controls. This circuit controls the escapement mechanism on the inner tube loader as described earlier, that mechanism dropping the inner tube into the index table 35. If there is an inner tube loading error, a suitable pulse is provided through Y3 "load error (inner)".

Figure 26B:
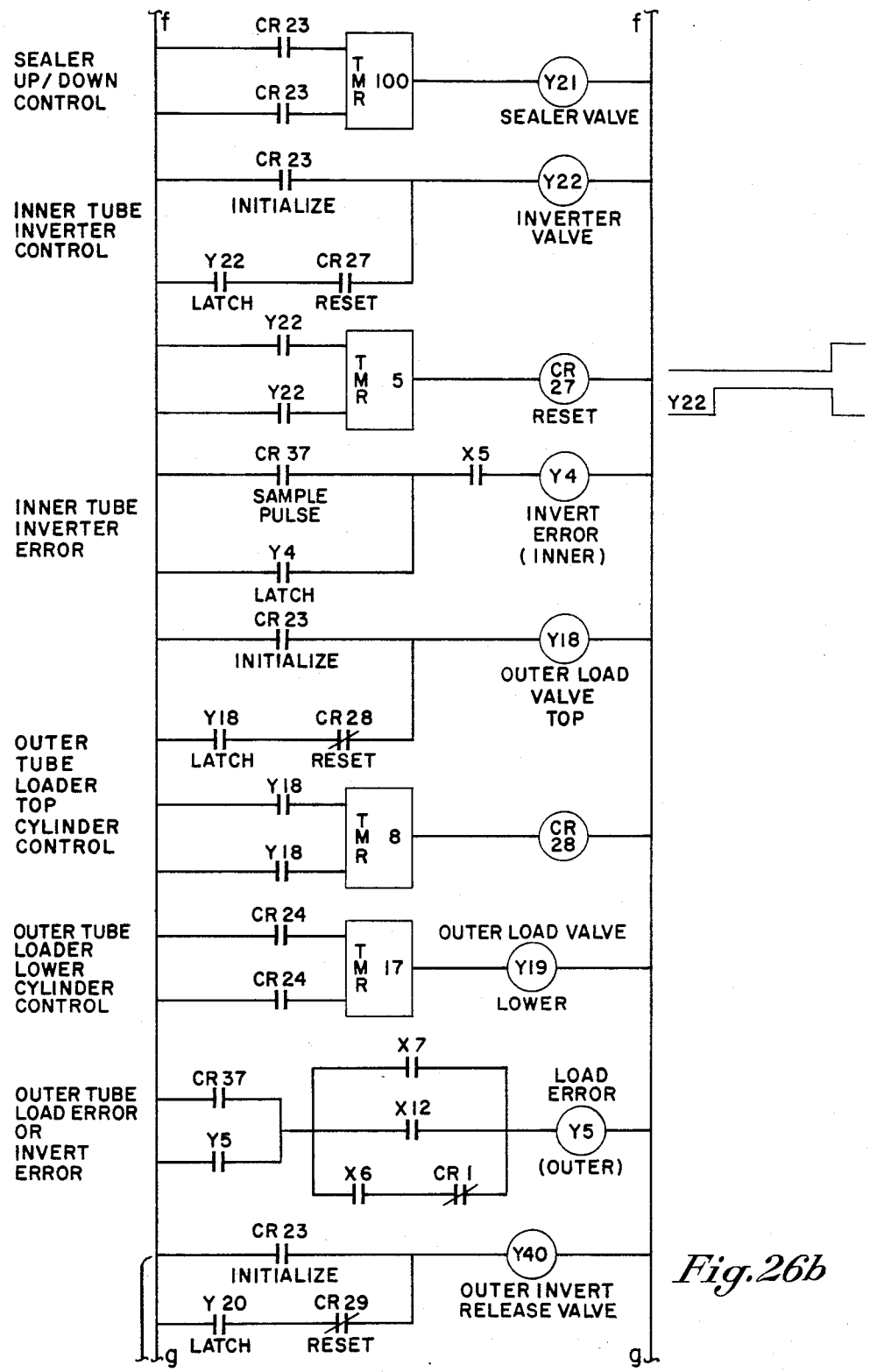
Figure 26C:
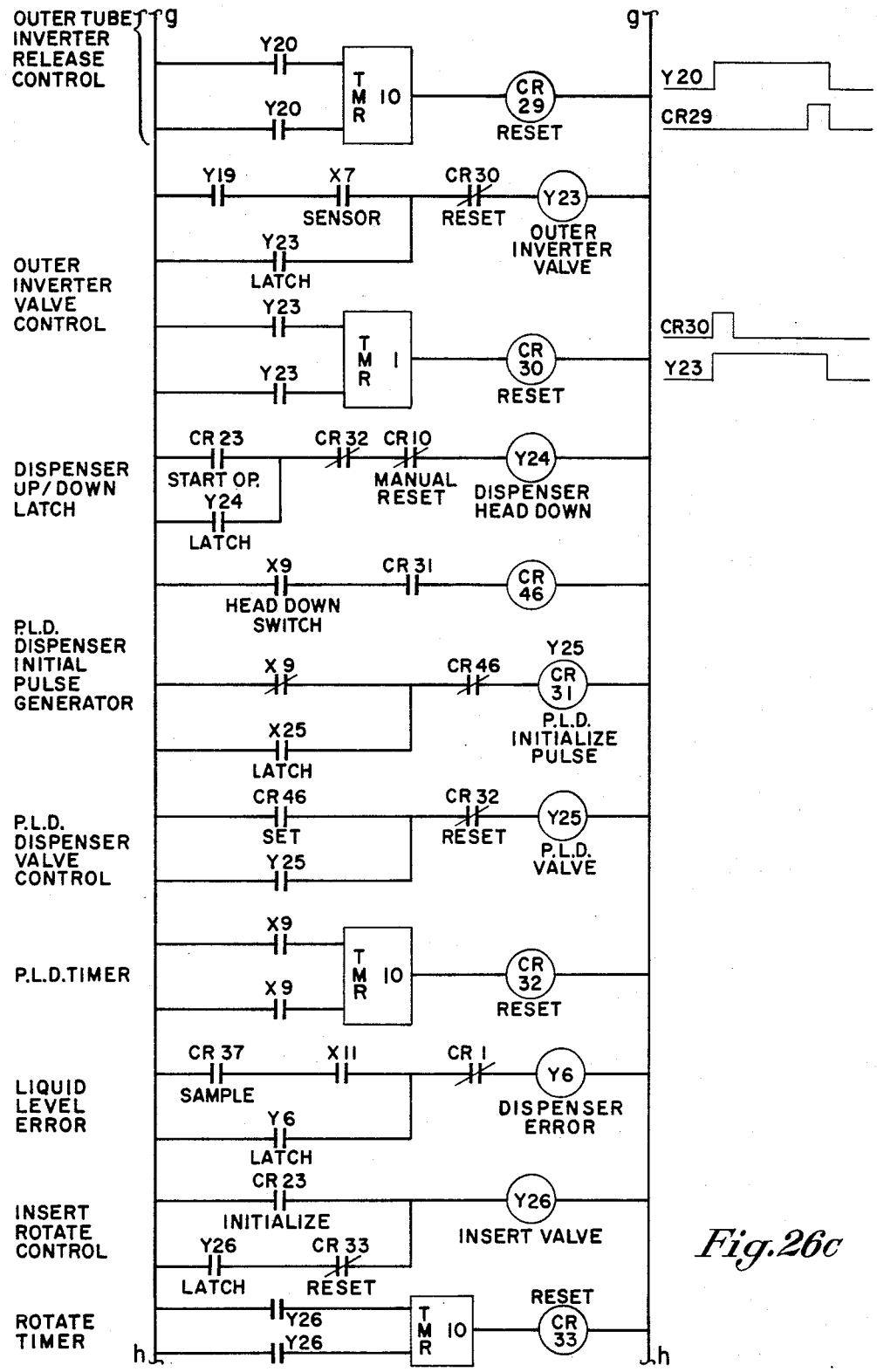
Figure 26D:
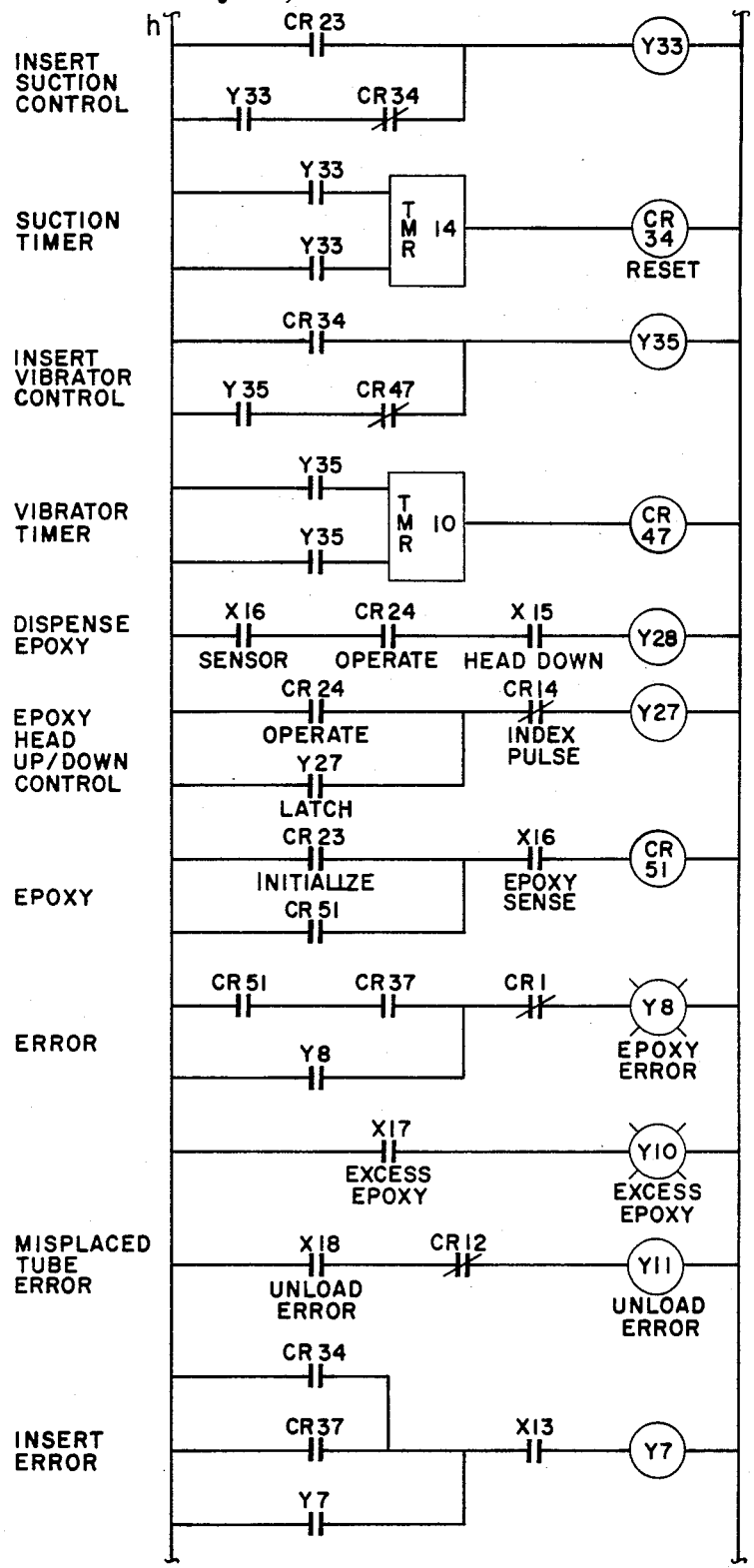

The next circuits at the bottom of FIG. 26a and top of FIG. 26b are the "sealer gas control" and "sealer up/down control." The ladder circuit includes a timer 100 (ten second timer). This merely keeps the sealer down unless the machine has been stopped for more than ten seconds. It is not necessary to raise and lower the torch for each tube so it is just held down. The terminology "sealer" is employed here to be synonymous with the flame 69, hypodermic needle 67, and machined aluminum tube 71 of the torch at the "seal inner tube" station 13, FIGS. 1 and 7.

The "inner tube inverter control" gives a 0.5 second pulse of air to blow the inner tube through the inner tube loop and X5 is a sensor which gives the inner tube invert error if the tube is not present after it has been given enough time to drop to be inverted.

The outer tube loader top and lower cylinder controls work the same way as did the inner tube top and lower cylinder controls. These circuits are identical to those of the inner tube. They cause the top and lower cylinder and the escapement mechanism to operate at the right sequence to drop the tube and to allow the next tube to be positioned for dropping. The outer tube release control operates unconditionally every cycle for one second. Y40 is activated and the outer tube cylinder shaft is retracted to allow the outer tube to drop. The "dispenser up-down latch" is activated at the beginning of each operate cycle. This causes the dispenser head to travel downwardly. When it is down, X9 of the "P.L.D. Dispenser Initial Pulse Generator" is activated and in the operate cycle, causing CR46 to activate. A P.L.D. initialize pulses is generated at CR31. (P.L.D. indicates precision liquid dispenser.) This activates Y25 which causes the liquid to be dispensed by the "P.L.D. Dispenser Valve Control" into the inner tube. The timer on the "P.L.D. timer" allows one second for this operation to occur. The "liquid level error" comprises a couple of sensors at the completion of the dispensing cycle that inspect to see that the proper amount of liquid is in the tube. If the photoelectic sensors detect that there is not the proper amount, then the signal Y6 is generated and this stops the machine with a dispenser error.

The "insert rotate control" and the "rotate timer" both control the arm that moves 180° to invert the inner tube and move it from its original position over the outer tube. The "insert suction control" and "suction timer" hold the inner tube in the vacuum and release it at the proper time. The "insert vibrator control", FIG. 26d effects vibration of the inner tube after it has been released and causes it to drop into the outer tube.

The "dispense epoxy" circuit operates as follows. Y28, at the beginning, activates the "epoxy head up/down control" and causes the epoxy dispense needle to move down against the outer tube. The "epoxy" is started to dispensing and there is a sensor X16 that is monitoring the dispensing of the epoxy. When the sensor X16 sees that the proper amount of epoxy has been dispensed, it activates Y28, which brings a halt to this cycle. If, at the end of the operation cycle, X16 has not been activated or inadequate epoxy is injected, as by running out of epoxy, or having the epoxy become too solidified to dispense properly, or for any reason the proper amount of epoxy is not in the tube, then CR51 is activated to show an error. This brings the machine to a halt. On the other hand, if the monitor X17 senses too much epoxy, then a signal Y10 is generated to show excess epoxy. This also is an error signal that stops the machine. There is a sensor that monitors the index table 35 after the tube has been unloaded and into the index plate and if it failed to unload that tube or if there is a tube in the index plate where there is not supposed to be one, then a "misplaced tube error" is generated by Y11 that halts the machinery. Moreover, if a tube has not been inserted into the outer tube properly; for example, if an inner tube is sticking too far out of the outer tube, that would generate an "insert error" signal Y7 and bring the machine to a halt before the next cycle.

Figure 27B:
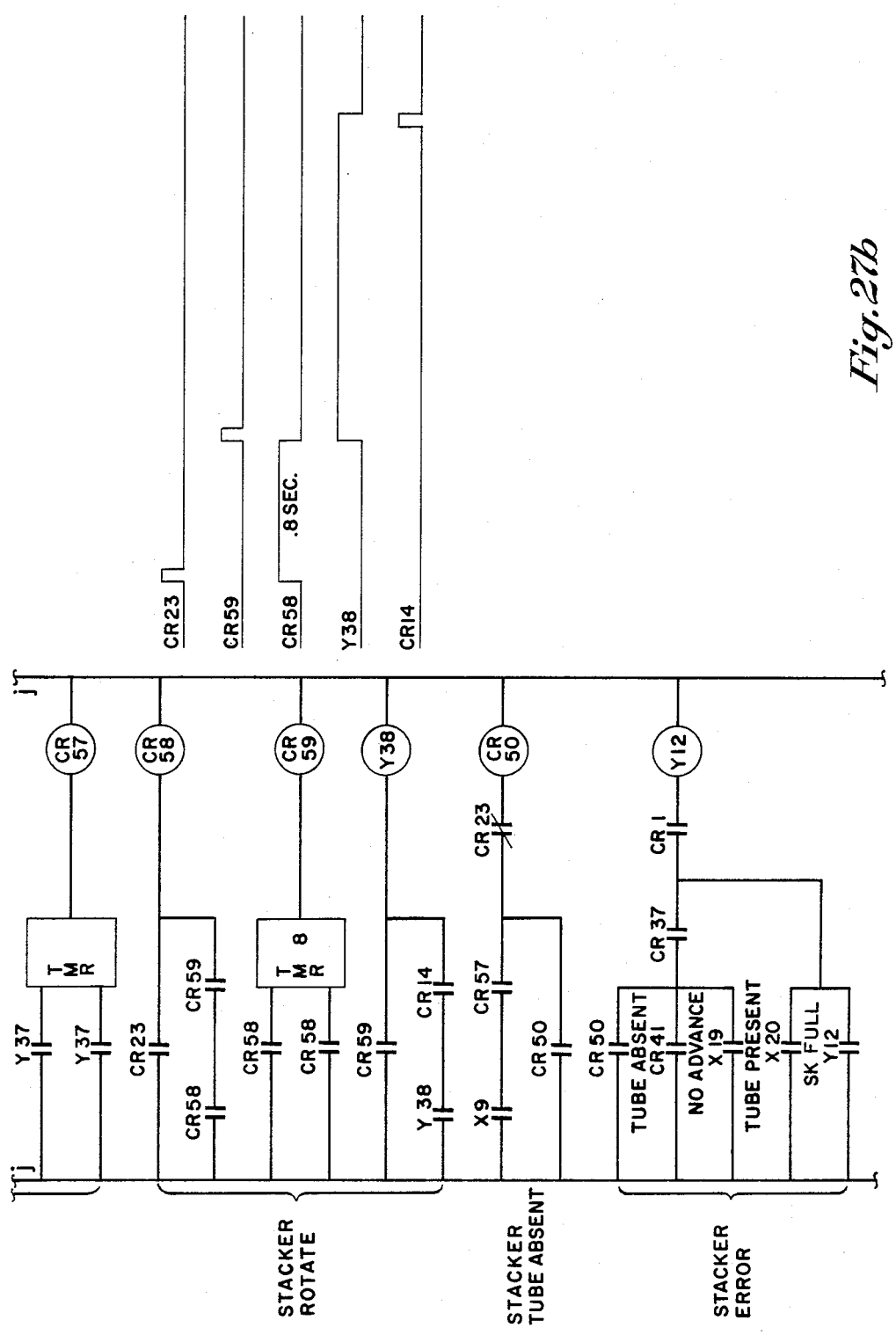

Referring to FIGS. 27a and 27b, there is illustrated the ladder diagram for the unloader and stacker mechanism on the SAM. This mechanism has to go through several motions to do the job properly. At the top left corner there is the "stacker up/down control". The stacker up and down control lowers and raises the gripper fingers 139, 141, described hereinbefore. It has a "stacker picker control" which controls the action of the gripper fingers and a "stacker rotate" control which rotates the gripper fingers through their 180° arc. Out to the right hand side in FIG. 27a, there is illustrated the respective timing and duration of the respective signals sent through CR23, Y29, CR52, CR53 and CR54, the presence sample pulse, CR23, CR59, CR58, Y30 and CR14. As described implied hereinbefore, the operation is that the picker fingers move down, grip, move up, rotate, move down, release, and then move back up and rotate back to the original position. If after all this occurs, there is a "stacker tube absent" on the stacker; for example, if the stacker did not drop a tube onto the stacker plate, then Y12 will occur and generate a "stacker error" that will stop the machine.

The respective O-ring interconnections are well known; for example, that allow conduits to conduct a vacuum, or lowered pressure, even though they are rotated. The hypodermic needles and the respective interconnecting tubing of syringes or the like are also well known. Consequently, these need not be detailed herein, just as the electronic controls for operating the respective solenoids and the like are well known, commercially available and need not be described in detail.

In the syringes of epoxy, it has been found helpful to pre-mix relatively large batches, separate them into respective syringes and then freeze the epoxy resin. It thaws quickly so that it can be started in the dispenser relatively quickly. A single syringe may allow running as much as 1200 or more of the shock detector tubes.

With respect to the accumulator table 131, it is adapted to receive twenty rows with one hundred eighty tubes per row. Accordingly, the rack that is currently employed includes twenty teeth to each row and then the accumulator is moved laterally to accommodate a new row.

With this unit, it has been possible to manufacture up to twelve hundred of the shock detectors per hour, e.g. 1 each 3 seconds.

The flexible gripper fingers 139, 141 themselves have a unique characteristic in being able to grasp the outer tube of the shock detector assembly firmly enough, yet being movable to accomodate inexact positioning without breaking the tube.

It has been found helpful to use an electrostatic spray gun to remove static electrical charge on the respective tubes and enable them to be properly dispensed by the vibratory feed bowls and escapement mechanism, as well as to help their interacting with each other when the inner tube is inserted within the outer tube.

The operation of the overall assembly line is complex if viewed from a time sequence point of view since there are multiple operations being carried out simultaneously. It is helpful to consider a single set of tubes for simplicity. For example, first the inner tube is loaded and is moved beneath the flame so that the upwardly protruding end is sealed. Thereafter, the inner tube is inverted and a liquid indicator means is dispensed thereinto. An outer tube is loaded and inverted if necessary to ensure that the open end of the outer tube is directed upwardly to receive the inner tube with the liquid therewithin. Thereafter, the inner tube is inserted within the outer tube with the liquid being disposed interiorly of the outer tube. Epoxy is then sealingly emplaced in the open end of the outer tube and the outer tube is inverted. This inversion allows the inner tube to sink into the epoxy to be held firmly in place with the liquid therewithin. Thereafter, the outer tube with the epoxy seal is stacked onto the accumulator. When a sufficient number; for example, about 3600 when 20 rows of 180 each are assembled, the completed shock detectors are raked from the Teflon coating into a container. The shock detectors will sustain this sort of mild shock since it is below the threshold for which they are designed. While the particular shock detectors illustrated in FIG. 19 are slightly sensitive to the direction of the shock it receives, a paired unit similar to that illustrated in FIG. 17 can be provided that is omnidirectional. Expressed otherwise, the shock detector 153 with its respective outer tubes 91 and inner tubes 41 is responsive equally to physical shock from any particular direction such that the liquid 127 from one end or the other will be spilled from the inner tube so as to wet the inner surface of the outer tube, and indicate that the shock has been received. If desired, the inner surface of the outer tube can be etched, fritted or otherwise have the surface area increased to amplify the indication given by the colored liquid being spilled from the inner tube 41.

From the foregoing, it can be seen that this invention achieves the objects delineated hereinbefore.

Although this invention has been described with a certain degree of particularity, it is understood that the present disclosure is made only by way of example and that numerous changes in the details of construction and the combination and arrangement of parts may be resorted to without departing from the spirit and the scope of the invention, reference being had for the latter purpose to the appended claims.

What is claimed is:

1. Apparatus for automated assembly of shock detectors having an indicator means within an inner tube sealingly disposed within an outer tube, the indicator means being adapted for indicating when a shock greater than a predetermined magnitude has been experienced; comprising:
   a. an assembly line means for assembling the shock detectors, including a plurality of stations at which specific jobs are performed and moving means for moving a plurality of elements from station to successive station;
   b. an inner tube loader means for loading the inner tube at an inner tube loader station;
   c. sealer means for sealing a first end of inner tube when it is disposed at a sealer station;
   d. inner tube inverter means for inverting said inner tube;
   e. indicator emplacement means for emplacing the indicator means within the inner tube;
   f. outer tube loader means for loading an outer tube at another station;
   g. combining and sealing means for combining the inner tube within the outer tube so as to form the shock detector;
   h. unloader means for unloading the shock detector from the assembly line means; and
   i. control means for controlling the assembly line, inner tube loader means, sealer means, indicator emplacement means, outer tube loader means, combining and sealing means and unloader means with a predetermined degree of automation.

2. The apparatus of claim 1 wherein said combining sealing means includes respective inverter means for inverting, respectively, the inner tube and the outer tubes that need inverting: inserter means for inserting the inner tube within the outer tube; and seal and invert means for sealing and inverting the outer tube with the inner tube therewithin.

3. The apparatus of claim 1 wherein said unloader means includes an accumulator for having stacked thereon the shock setectors; accumulator index means for indexing said accumulator after each said shock detector is stacked thereon until a completed circular row is stacked thereonto; and accumulator advance means for advancing said accumulator for receiving a next row of shock detectors until the predetermined number of rows have been accumulated; said accumulator having a slick surface to minimize sticking of sealer in the end of an inverted outer tube containing an inner tube therewithin when the outer tube is stacked onto said accumulator such that accumulated shock detectors can be wiped easily from said accumulator into bulk storage.

4. The apparatus of claim 1 wherein said inner tube loader and said outer tube loader includes vibratory bowl with interiorly upwardly spiraling tracks terminating in a downwardly directed vertical tube with a pair of escapement mechanisms disposed so as to trap the tubes singly and individually release the respective tubes into respective receiving receptacles in the rotary indexing table.

5. The apparatus of claim 1 wherein said sealer means includes a flame hot enough to melt the end of the inner tube and effect sealing thereof, said flame being disposed so as to contact the upwardly protruding end of the inner tube and effect the sealing while the inner tube waits movement on to the next station.

6. The apparatus of claim 1 wherein said inner tube inverter means includes an aperture disposed beneath the sealed inner tube, an air passageway, solenoid valve for venting pressurized air to said passageway for blowing said tube upwardly; and an inverting tube bent through 180° for allowing said inner tube to be blown upwardly therethrough, said 180° tube containing an aperture and having an association therewith an escapement mechanism for holding said inner tube until its receiving receptacle is moved beneath the downstream end thereof and releasing the inverted inner tube into the receiving receptacle when properly oriented.

7. The apparatus of claim 1 wherein said indicator emplacement means includes a liquid containing syringe for injecting a precisely measured predetermined small amount of indicator interiorly of the inner tube with its open end protruding upwardly, said liquid emplacement means including not only the syringe but also a hypodermic needle that is moved upwardly and downwardly to be moved within the inner tube for accurate emplacement of the liquid and means for displacing through the hypodermic needle into the inner tube a precisely determined amount of said liquid indicator.

8. The apparatus of claim 1 wherein said combining and sealing means for combining the inner tube within the outer tube includes a first means for ensuring that the outer tube has its open end protruding upwardly and a second means for inverting the inner tube with the liquid therewithin and inserting it within the outer tube.

9. The apparatus of claim 8 wherein said second means for inverting the inner tube and inserting it within the outer tube includes a vacuum tube for picking up the inner tube and a rotary actuator and rotary actuator arm for rotating it over into alignment with the outer tube for being dropped thereinto; and includes a vibrator for mildly vibrating the inner tube for dropping it interiorly of the closely fitting outer tube.

10. The apparatus of claim 8 wherein said first means for ensuring the outer tube has its open end upwardly includes a photoelectric sensor for determining if the upwardly protruding end of the outer tube is sealed or open and, if sealed, directing a signal to a controller for inverting; a controller for controlling pneumatic air valve; a pneumatic tube serving as a source of pneumatic air, and a valve for directing the air through a passageway for blowing the tube upwardly through a 180° inverting tube; a passageway and aperture disposed beneath the outer tube; an inverting tube disposed immediately above the outer tube, said 180° inverting tube including escapement mechanism for trapping the outer tube once it has been inverted until its receiving receptacle has been moved therebeneath and in alignment therewith; said escapement mechanism being connected with a source of pneumatic air and a control for operating when the indexing table has been moved therebeneath.

11. The apparatus of claim 8 wherein said combining and sealing means also includes an epoxy dispensing station for dispensing epoxy sealingly into the open end of the outer tube; and includes means for inverting the outer tube such that the inner tube will sink into the epoxy seal before the epoxy cures.

12. The apparatus of claim 1 wherein said unloader means includes up and down controller, up and down movement mechanism, gripper fingers for gripping the outer tube and pneumatic means for effecting gripping of the gripper fingers, rotater mechanism for rotating through 180° for unloading the outer tube and inverting it so that it is emplaced onto an accumulator surface that is Teflon coated such that the epoxy seal forms a mild adhesive action with the Teflon surface, yet is readily raked therefrom without severe sticking problems.

13. The apparatus of claim 12 wherein said gripper fingers are pivotally movable responsive to a fluid powered cylinder and said pneumatically operated cylinder effects gripping action but in which spring is used only to open gripper fingers gripping force is controlled by pressure in air cylinder at the opposite end of the pneumatic fingers so they are moved together with a predetermined force of the spring so as to grip with sufficient force, yet have inadequate force to effect crushing of the outer tube.

* * * * *